US012145547B2

(12) United States Patent
Leiber et al.

(10) Patent No.: US 12,145,547 B2
(45) Date of Patent: Nov. 19, 2024

(54) ACTUATING DEVICE FOR AN ENTIRELY OR PARTIALLY HYDRAULICALLY OPERATING BRAKING SYSTEM FOR A VEHICLE

(71) Applicant: IPGATE AG, Pfäffikon (CH)

(72) Inventors: Thomas Leiber, Rogoznica (HR); Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 442 days.

(21) Appl. No.: 17/429,562

(22) PCT Filed: Feb. 12, 2020

(86) PCT No.: PCT/EP2020/053609
§ 371 (c)(1),
(2) Date: Aug. 9, 2021

(87) PCT Pub. No.: WO2020/165255
PCT Pub. Date: Aug. 20, 2020

(65) Prior Publication Data
US 2022/0105914 A1 Apr. 7, 2022

(30) Foreign Application Priority Data

Feb. 12, 2019 (DE) ..................... 20 2019 101 586.1
Mar. 21, 2019 (DE) ..................... 10 2019 107 334.0

(51) Int. Cl.
*B60T 13/14* (2006.01)
*B60T 7/04* (2006.01)
(Continued)

(52) U.S. Cl.
CPC ............ *B60T 13/142* (2013.01); *B60T 7/042* (2013.01); *B60T 13/662* (2013.01);
(Continued)

(58) Field of Classification Search
None
See application file for complete search history.

(56) References Cited

U.S. PATENT DOCUMENTS

| 5,588,718 A | 12/1996 | Winner et al. |
| 5,986,368 A | 11/1999 | Wetzel et al. |

(Continued)

FOREIGN PATENT DOCUMENTS

| CN | 101039829 A | 9/2007 |
| CN | 101341056 A | 1/2009 |

(Continued)

OTHER PUBLICATIONS

Office Action (First Examination Report) issued on Feb. 17, 2023, by the Intellectual Property India in corresponding India Patent Application No. 202117038290 with English Translation.
(Continued)

*Primary Examiner* — Melanie Torres Williams
(74) *Attorney, Agent, or Firm* — Panitch Schwarze Belisario & Nadel LLP

(57) ABSTRACT

An actuating device for an entirely or partially hydraulic vehicle braking system includes a master brake cylinder with a piston and a working chamber hydraulically connectable to a reservoir, a pedal feel simulator, and, via at least one normally open valve, at least one brake circuit. At least one hydraulic wheel brake is assigned to a brake circuit and connected thereto via at least one separate controllable switching valve. A pressure supply unit has a motor-driven piston and a cylinder. At least one valve assembly includes wheel-specific solenoid pressure control valves. At least one electrical control unit controls valves of the valve assembly and the motor of the pressure supply unit. Outlet valves enable discharge of hydraulic medium from wheel brakes or brake circuits into the reservoir. One housing contains the valve assembly and hydraulic component of the pressure
(Continued)

Figure 1:
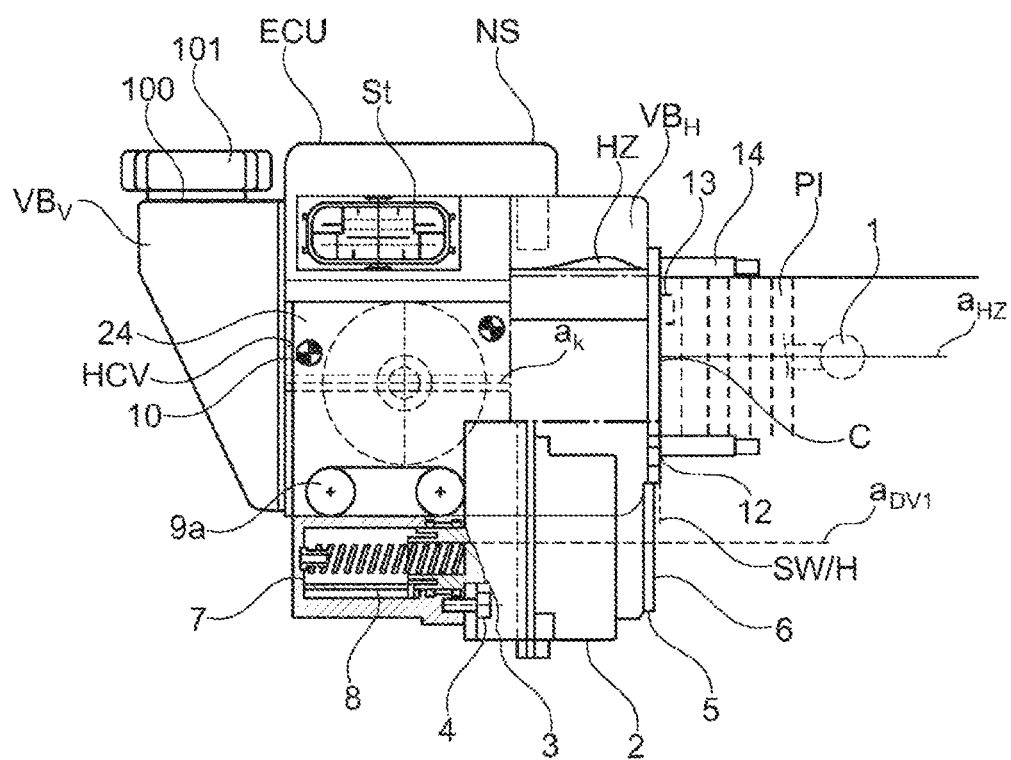

supply unit, and a separate housing contains the master brake cylinder.

13 Claims, 12 Drawing Sheets

(51) Int. Cl.
  *B60T 13/66* (2006.01)
  *B60T 13/68* (2006.01)
  *B60T 13/74* (2006.01)
  *B60T 8/36* (2006.01)
(52) U.S. Cl.
  CPC .......... *B60T 13/686* (2013.01); *B60T 13/745* (2013.01); *B60T 8/368* (2013.01)

(56) References Cited

U.S. PATENT DOCUMENTS

| | | |
|---|---|---|
| 5,988,767 A | 11/1999 | Inoue et al. |
| 6,042,200 A | 3/2000 | Hosoya et al. |
| 6,517,170 B1 | 2/2003 | Hofsaess et al. |
| 9,776,604 B2 | 10/2017 | Lee et al. |
| 10,173,659 B2 | 1/2019 | Kim et al. |
| 10,513,249 B2 | 12/2019 | Kim |
| 10,688,979 B2 | 6/2020 | Leiber et al. |
| 11,554,765 B2 | 1/2023 | Leiber et al. |
| 11,565,678 B2 | 1/2023 | Zander et al. |
| 2008/0246334 A1 | 10/2008 | Drescher |
| 2009/0115247 A1 | 5/2009 | Leiber et al. |
| 2010/0001577 A1 | 1/2010 | Hatano |
| 2012/0235469 A1 | 9/2012 | Miyazaki et al. |
| 2013/0103277 A1 | 4/2013 | Attallah et al. |
| 2013/0213025 A1 | 8/2013 | Linden |
| 2014/0203626 A1 | 7/2014 | Biller et al. |
| 2014/0216866 A1 | 8/2014 | Feigel et al. |
| 2015/0203085 A1 | 7/2015 | Maruo et al. |
| 2015/0283987 A1 | 10/2015 | Bareiss |
| 2016/0009263 A1 | 1/2016 | Feigel et al. |
| 2016/0009267 A1 | 1/2016 | Lesinski, Jr. |
| 2016/0023644 A1 | 1/2016 | Feigel et al. |
| 2016/0107629 A1 | 4/2016 | Han |
| 2016/0185329 A1 | 6/2016 | Lee et al. |
| 2016/0221562 A1 | 8/2016 | Leiber et al. |
| 2016/0311422 A1 | 10/2016 | van Zanten et al. |
| 2016/0375886 A1 | 12/2016 | Jung |
| 2017/0015293 A1 | 1/2017 | Yagashira et al. |
| 2017/0106843 A1 | 4/2017 | Jeong |
| 2017/0158184 A1 | 6/2017 | Choi et al. |
| 2017/0182988 A1 | 6/2017 | Kawakami et al. |
| 2017/0327098 A1 | 11/2017 | Leiber et al. |
| 2017/0334417 A1 | 11/2017 | Choi et al. |
| 2017/0361825 A1 | 12/2017 | Drumm et al. |
| 2018/0065605 A1 | 3/2018 | Leiber et al. |
| 2018/0065609 A1 | 3/2018 | Leiber et al. |
| 2018/0126970 A1 | 5/2018 | Leiber et al. |
| 2018/0215366 A1 | 8/2018 | Leiber et al. |
| 2018/0334149 A1 | 11/2018 | Feigel |
| 2019/0031165 A1 | 1/2019 | Besier et al. |
| 2019/0100182 A1 | 4/2019 | Leiber et al. |
| 2019/0344769 A1 | 11/2019 | Zimmermann et al. |
| 2020/0047731 A1 | 2/2020 | Reuter |
| 2020/0079335 A1 | 3/2020 | Linhoff et al. |
| 2020/0079338 A1 | 3/2020 | Roh |
| 2020/0139948 A1 | 5/2020 | Leiber et al. |
| 2020/0139949 A1 | 5/2020 | Dolmaya et al. |
| 2020/0172068 A1 | 6/2020 | Leiber et al. |
| 2020/0406880 A1 | 12/2020 | Zimmermann et al. |
| 2021/0053540 A1 | 2/2021 | Besier et al. |
| 2021/0094524 A1 | 4/2021 | Wetzel |
| 2021/0179051 A1 | 6/2021 | Alford et al. |
| 2021/0245725 A1 | 8/2021 | Courth et al. |
| 2021/0309197 A1 | 10/2021 | Weh et al. |
| 2022/0041150 A1 | 2/2022 | Leiber |
| 2022/0135013 A1 | 5/2022 | Leiber et al. |
| 2023/0356700 A1 | 11/2023 | Jia et al. |
| 2024/0001899 A1 | 1/2024 | Stanojkovski |

FOREIGN PATENT DOCUMENTS

| | | |
|---|---|---|
| CN | 101987616 A | 3/2011 |
| CN | 102414063 A | 4/2012 |
| CN | 102616229 A | 8/2012 |
| CN | 102639370 A | 8/2012 |
| CN | 102822025 A | 12/2012 |
| CN | 103253251 A | 8/2013 |
| CN | 103318160 A | 9/2013 |
| CN | 103347754 A | 10/2013 |
| CN | 103874609 A | 6/2014 |
| CN | 104640755 A | 5/2015 |
| CN | 107107885 A | 8/2017 |
| CN | 107428325 A | 12/2017 |
| CN | 107472232 A | 12/2017 |
| DE | 4340467 A1 | 6/1995 |
| DE | 19914403 A1 | 10/2000 |
| DE | 10025038 A1 | 11/2001 |
| DE | 10028092 A1 | 12/2001 |
| DE | 10158065 A1 | 6/2003 |
| DE | 10259489 A1 | 7/2004 |
| DE | 10319338 A1 | 11/2004 |
| DE | 102005017958 A1 | 4/2006 |
| DE | 102005055751 A1 | 11/2006 |
| DE | 102007016948 B3 | 8/2008 |
| DE | 102008015241 A1 | 9/2008 |
| DE | 102009008944 A1 | 8/2010 |
| DE | 102009055721 A1 | 6/2011 |
| DE | 102011086258 A1 | 5/2012 |
| DE | 102012210809 A1 | 1/2013 |
| DE | 102012213216 A1 | 2/2013 |
| DE | 102012217825 A1 | 4/2014 |
| DE | 102013217954 A1 | 3/2015 |
| DE | 102013017205 A1 | 4/2015 |
| DE | 102013224783 A1 | 6/2015 |
| DE | 112013004634 T5 | 6/2015 |
| DE | 102014225962 A1 | 6/2016 |
| DE | 202015008975 U1 | 6/2016 |
| DE | 102015103858 A1 | 9/2016 |
| DE | 102015104246 A1 | 9/2016 |
| DE | 112015002162 T5 | 1/2017 |
| DE | 102016222765 A1 | 5/2017 |
| DE | 102016105232 A1 | 9/2017 |
| DE | 102016203563 A1 | 9/2017 |
| DE | 102017219257 A1 | 4/2018 |
| DE | 102016225537 A1 | 6/2018 |
| DE | 102017200955 A1 | 7/2018 |
| DE | 102017219598 A1 | 7/2018 |
| DE | 102017222435 A1 | 7/2018 |
| DE | 102017222450 A1 | 7/2018 |
| DE | 102017207954 A1 | 11/2018 |
| DE | 102017113563 A1 | 12/2018 |
| DE | 102017212016 A1 | 1/2019 |
| DE | 102018111126 A1 | 11/2019 |
| DE | 102019219158 A1 | 6/2021 |
| EP | 280740 A1 | 9/1988 |
| EP | 2881292 A1 | 6/2015 |
| EP | 2883766 A1 | 6/2015 |
| EP | 2744691 B1 | 7/2015 |
| EP | 3225480 A1 | 10/2017 |
| EP | 3225481 A1 | 10/2017 |
| EP | 3333031 A1 | 6/2018 |
| GB | 589075 A | 6/1947 |
| GB | 8514135 | 7/1985 |
| GB | 2160273 A | 12/1985 |
| GB | 8703148 | 2/1987 |
| GB | 2186932 A | 8/1987 |
| JP | H8282459 A | 10/1996 |
| JP | H10329699 A | 12/1998 |
| JP | 2001097201 A | 4/2001 |
| KR | 20090077182 A | 7/2009 |
| KR | 20170012348 A | 2/2017 |
| WO | 2006111393 A1 | 10/2006 |
| WO | 2012034661 A1 | 3/2012 |
| WO | 2012059175 A1 | 5/2012 |

(56) References Cited

FOREIGN PATENT DOCUMENTS

| | | | | |
|---|---|---|---|---|
| WO | 2012146461 | A1 | 11/2012 | |
| WO | 2013010554 | A1 | 1/2013 | |
| WO | 2013037568 | A1 | 3/2013 | |
| WO | WO-2014135446 | A2 * | 9/2014 | ............ B60T 11/103 |
| WO | 2015024795 | A1 | 2/2015 | |
| WO | 2015032637 | A1 | 3/2015 | |
| WO | 2015106892 | A1 | 7/2015 | |
| WO | 2016012331 | A1 | 1/2016 | |
| WO | 2016023994 | A1 | 2/2016 | |
| WO | 2016023995 | A1 | 2/2016 | |
| WO | 2016120292 | A1 | 8/2016 | |
| WO | 2016146223 | A2 | 9/2016 | |
| WO | 2017055152 | A1 | 4/2017 | |
| WO | 2017148968 | A1 | 9/2017 | |
| WO | 2017153072 | A1 | 9/2017 | |
| WO | 2018019671 | A1 | 2/2018 | |
| WO | 2018130482 | A1 | 7/2018 | |
| WO | 2018130483 | A1 | 7/2018 | |
| WO | WO-2018210534 | A1 * | 11/2018 | ............ B60T 13/146 |
| WO | 2018234387 | A1 | 12/2018 | |
| WO | 2019002475 | A1 | 1/2019 | |
| WO | 2019215283 | A1 | 11/2019 | |

OTHER PUBLICATIONS

Office Action issued May 16, 2023 in Chinese Application No. 202080021255.X with English Translation.
Office Action issued May 17, 2023 in Chinese Application No. 202080021265.3 with English Translation.
Office Action issued May 22, 2023 in Chinese Application No. 202080022277.8 with English Translation.
Int'l Search Report and Written Opinion issued Oct. 22, 2019 in Int'l Application No. PCT/EP2019/068596, English translation of Int'l Search Report only.
Int'l Search Report and Written Opinion issued Oct. 30, 2019 in Int'l Application No. PCT/EP2019/057123, English translation of Int'l Search Report only.
Int'l Search Report and Written Opinion issued Nov. 4, 2019 in Int'l Application No. PCT/EP2019/068592, English translation of Int'l Search Report only.
Int'l Search Report and Written Opinion issued Apr. 1, 2020 in Int'l Application No. PCT/EP2020/053626, English translation of Int'l Search Report only.
Int'l Search Report and Written Opinion issued Apr. 28, 2020 in Int'l Application No. PCT/EP2020/053609, English translation of Int'l Search Report only.
Int'l Search Report and Written Opinion issued Apr. 28, 2020 in Int'l Application No. PCT/EP2020/053613, English translation of Int'l Search Report only.
Int'l Search Report and Written Opinion issued May 19, 2020 in Int'l Application No. PCT/EP2020/053665, English translation of Int'l Search Report only.
Int'l Search Report and Written Opinion issued May 19, 2020 in Int'l Application No. PCT/EP2020/053668, English translation of Int'l Search Report only.
Int'l Search Report and Written Opinion issued Jun. 5, 2020 in Int'l Application No. PCT/EP2020/053667, English translation of Int'l Search Report only.
Int'l Search Report and Written Opinion issued Oct. 9, 2020 in Int'l Application No. PCT/EP2020/053666, English translation of Int'l Search Report only.
Search Report issued Dec. 20, 2019 in DE Application No. 10 2019 103 464.7.
Search Report issued Jan. 3, 2020 in DE Application No. 10 2019 103 483.3.
Search Report issued Apr. 2, 2020 in DE Application No. 10 2019 107 334.0, Nov. 18, 2023.
Office Action issued Apr. 20, 2023 in European Aplication No. 19714344.9-1012 with English Translation.
Office Action issued Mar. 28, 2023 in Japanese Aplication No. 2021-547138 with English Translation.
Office Action issued Dec. 28, 2023 in U.S. Appl. No. 17/429,593.
Office Action issued Oct. 24, 2023 in U.S. Appl. No. 17/426,615.
Notice of Allowance issued Jan. 24, 2024 in U.S. Appl. No. 17/429,608.
Corrected Notice of Allowance issued Feb. 1, 2024 in U.S. Appl. No. 17/429,608.
Office Action issued Mar. 16, 2022 in U.S. Appl. No. 17/429,620.
Office Action issued Jan. 25, 2024 n European Aplication No. 20706153.2-1012 with English Translation.
Office Action issued Feb. 29, 2024 in U.S. Appl. No. 17/429,423.
Notice of Allowance issued Mar. 6, 2024 in U.S. Appl. No. 17/429,615.
Office Action issued Dec. 7, 2023 in U.S. Appl. No. 17/429,578.
Office Action issued Mar. 28, 2024 in U.S. Appl. No. 17/429,527.
Office Action issued Mar. 14, 2024 in U.S. Appl. No. 17/429,578.
Notice of Allowance issued Mar. 27, 2024 in U.S. Appl. No. 17/429,608.
Office Action issued Feb. 15, 2024 in European Application No. 19 742 145.6-1012 with.
Office Action issued Mar. 12, 2024 in JP Application No. 2021-547137 with English Translation.
Office Action issued Jun. 3, 2024 in U.S. Appl. No. 17/429,380.

* cited by examiner

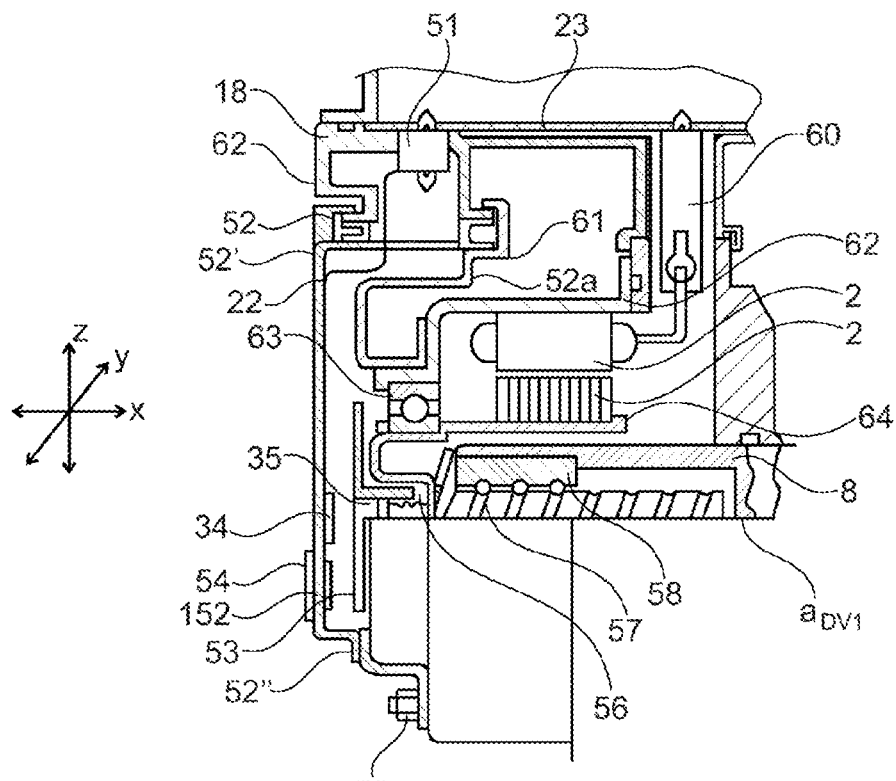
Fig. 1a
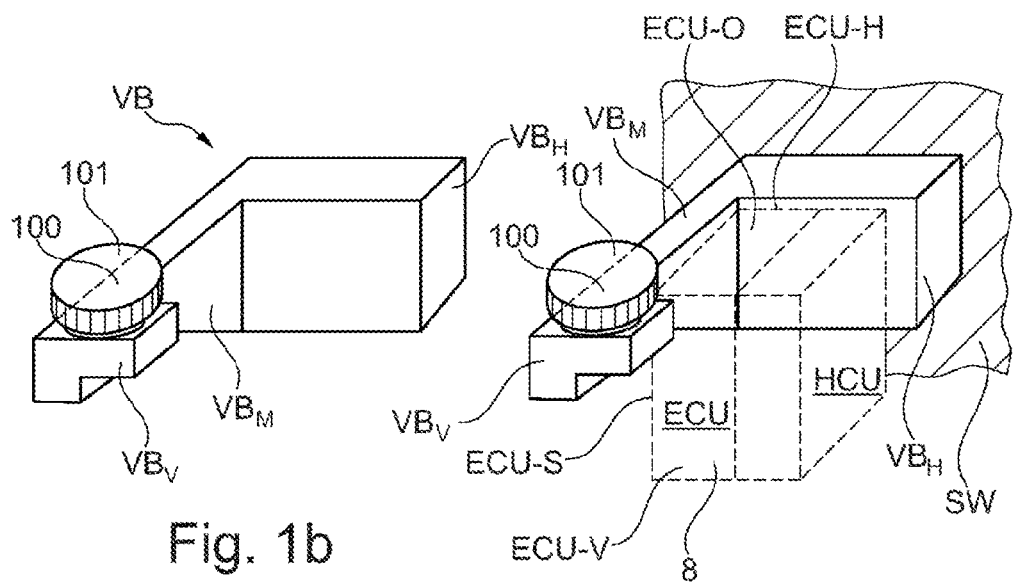
Fig. 1b
Fig. 1c

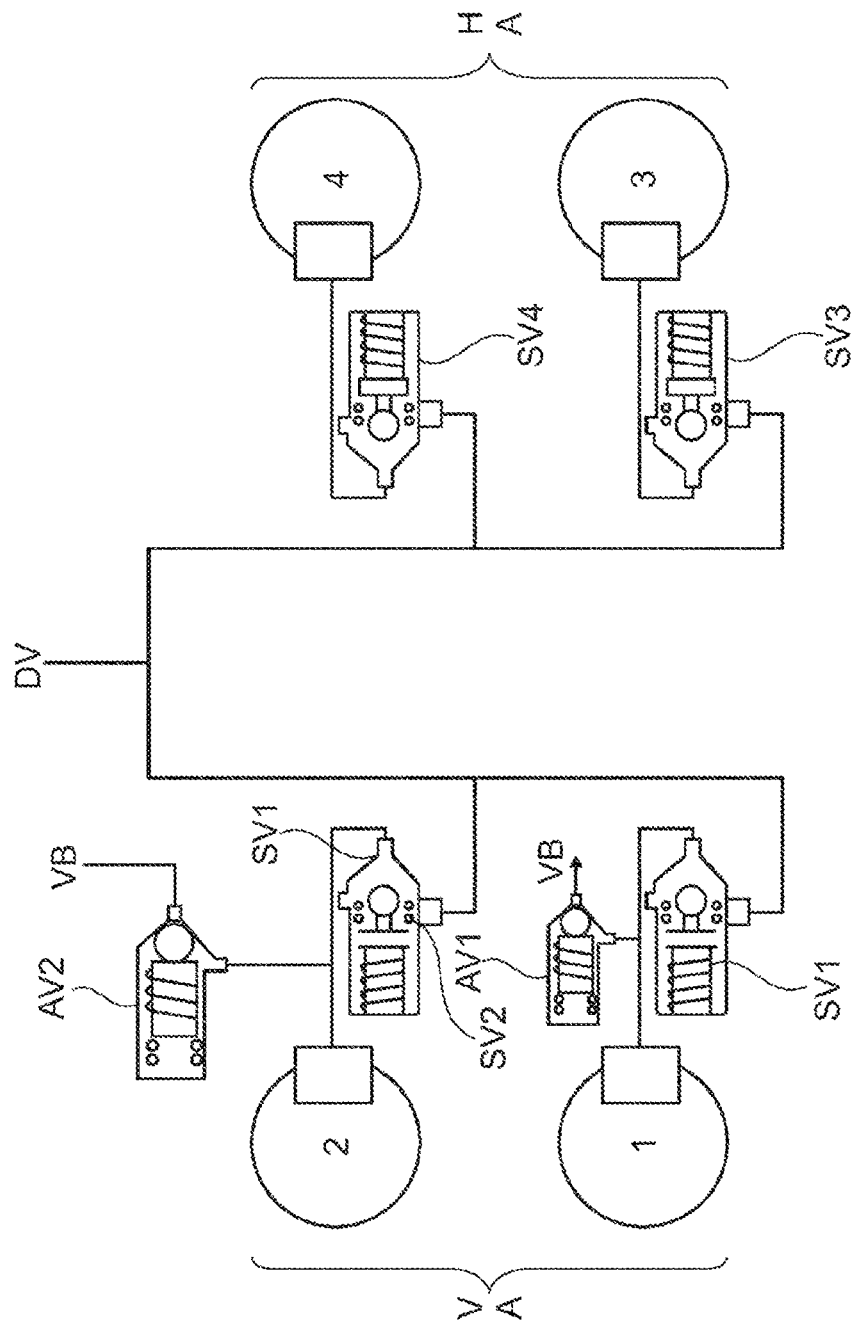

ACTUATING DEVICE FOR AN ENTIRELY OR PARTIALLY HYDRAULICALLY OPERATING BRAKING SYSTEM FOR A VEHICLE

CROSS-REFERENCE TO RELATED APPLICATION

This application is a Section 371 of International Application No. PCT/EP2020/053609, filed Feb. 12, 2020, which was published in the German language on Aug. 20, 2020 under International Publication No. WO 2020/165255 A1, which claims priority under 35 U.S.C. § 119(b) to German Patent Application No. 20 2019 101 586.1, filed Feb. 12, 2019, and to German Patent Application No. 10 2019 107 334.0, filed Mar. 21, 2019, the disclosures of which are incorporated herein by reference.

The present invention relates to an actuating device for a fully or partially hydraulically acting brake system for a vehicle, having a master brake cylinder which has a piston-cylinder unit with a piston and a working chamber, wherein the working chamber is hydraulically connected or connectable to a reservoir and to a pedal feel simulator and is mechanically connected via an actuating device, in particular a brake pedal, and the working chamber is connectable via at least one valve, which is open when electrically deenergized, to at least one brake circuit, and that at least one hydraulically acting wheel brake which is assigned to a brake circuit and which is assigned in each case at least one dedicated controllable switching valve by means of which the wheel brake is connectable to the respective brake circuit for pressure build-up and pressure reduction, in particular in brake force boosting operation, and having a pressure supply which is driven by an electric motor and the piston of which is adjustable by means of the electric motor in the cylinder, at least one valve arrangement with solenoid valves for wheel-specific closed-loop pressure control, and at least one electrical control unit for controlling at least valves of the valve arrangement and of the motor of the pressure supply, and at least one controlled outlet valve, via which hydraulic medium can, in particular in an ABS function or during closed-loop control operation, be discharged directly from the respective wheel brake or the brake circuit into the reservoir.

PRIOR ART

The requirements, in particular safety requirements, for semi-automated (SAD) and fully automated (FAD) driving have a major influence on the system configuration. These require redundant and partially redundant systems and components.

The focus here is on the pressure supply, with which the braking force or the pressure build-up must be ensured even without a driver's foot. The electronic controller must correspondingly also be configured for this function. For level 3, in particular level 4, the ABS function must likewise be ensured even in the event of a fault.

With a redundant pressure supply, it is also possible to implement a system concept without tandem master cylinder HZ, only with a so-called electric pedal, or, for level 5, only with a brake switch. Here, the following patent applications are of note: DE 10 2017 222 450 discloses a hydraulic system with only one master cylinder, a redundant pressure supply, isolation valves to the master cylinder, and a travel simulator. A bypass valve between the two brake circuits allows a supply to both brake circuits in the event of a pressure supply failure of the second pressure supply. This valve, which is open when electrically deenergized, is extremely relevant to safety, because a failure of the valve and for example of a brake circuit can result in a total brake failure. Furthermore, the expenditure on valves is very high.

DE 10 2017 222 435 and DE 10 2016 225 537 present a similar concept, but with an electric pedal, reduced pressure supply and bypass valve. All systems use a so-called outlet valve for the ABS function during the pressure reduction. If, upon the opening of the valve, a dirt particle enters the valve seat thereof, this can cause a brake circuit failure during the next braking operation.

DE 10 2017 207 954 presents a system concept with redundant pressure supply and without outlet valves for the closed-loop ABS pressure control. The so-called multiplex method already described in DE 102005055751 and DE 102009008944 A1 is used here, in which the pressure control for ABS is performed from the pressure supply by means of volume measurement and pressure information. Here, the switching valves for the pressure control are also used redundantly. A safety risk arises if the piston seal or a check valve to the reservoir fails and the switching valve is leaking owing to dirt particles, which likewise results in a total brake failure.

The above examples demonstrate the problem of dormant faults, which become critical in the case of double faults if these cannot be detected by the diagnosis before the braking maneuver.

The packaging or structural volume of the brake system is likewise of great importance. In particular in the case of systems with SAD (semi-automated) and FAD (fully automated driving), many variants from level 2 with tandem master brake cylinder (THZ) or single master brake cylinder (HZ) to level 5 without THZ or HZ must be taken into consideration in in the configuration of the structural design. In particular, 3-5 concepts with 2 pressure supplies or pressure supply devices (DV) are difficult to implement in terms of packaging with a small construction volume. Examples of packaging are known from EP 2744691 with a vertical arrangement of the pressure supply (DV) with respect to the master brake cylinder (HZ) axis and DE 2016032116160400 with a parallel arrangement of the pressure supply device with respect to the master brake cylinder (HZ) axis, which require a smaller structural width. A single master brake cylinder generally requires a brake system with multiple redundancies. This can be achieved if the master brake cylinder is designed, for example, with redundant and diagnosable seals, as well as further redundancies in the pressure supply (for example pressure supply with 2×3 phase connection, redundant on-board electrical system connection) are provided and in particular further modules can be used for braking (for example electric parking brake, electric drive motor).

DE102016105232 A1 has already disclosed a packaging with a small structural volume in the case of which an integrated redundant pressure supply composed of at least one pressure supply device, with valves, in particular solenoid valves combined in a hydraulic unit, with at least one electronic open-loop and closed-loop control unit, at least one reservoir, and a master brake cylinder is combined in one module.

OBJECT OF THE INVENTION

It is the object of the present invention to create a very inexpensive 1-box solution, which is of short and narrow construction, for automated driving of levels 2 to 3, which is furthermore modular for other solutions based thereon with subsequent integration of a second pressure supply.

Advantages of the Invention

Said object and further advantages may be achieved by means of a brake system according to one or more of the accompanying claims.

A packaging with a small structural volume is proposed, having an integrated redundant pressure supply composed of a pressure supply device, with valves, in particular solenoid valves combined in a hydraulic unit, with at least one electronic open-loop and closed-loop control unit, at least one reservoir, with a single master brake cylinder and pedal stroke sensors and travel simulator with piston. The invention provides different variants of modular actuation systems for brake systems which comprise as many identical parts as possible for manufacturing and assembly.

Possible variants according to the invention are preferably:

Variant a:
is a 1-box solution with only one module, which comprises a pressure supply device, the valve arrangement (HCU), open-loop and closed-loop control unit (ECU) and reservoir (VB), Variant b:
is a 1-box solution with only one module, which has the pressure supply device, wherein at least one pressure supply device is of redundant configuration, that is to say for example with a double on-board electrical system connection or redundant phase windings, and wherein the valve arrangement (HCU), control unit (ECU) and reservoir (VB) are likewise included in the module.

Variant c:
the same module as with variant c., but with an open-loop and closed-loop control unit of fully or partially redundant configuration.

Variant d:
the use of an electric drive motor and/or an electric parking brake for braking, especially in the event of failure of modules/subsystems.

The housings described below are advantageously used here. These housings form subassemblies which, when assembled, form the entire unit for installation into the vehicle:

Housing A: comprises the valve arrangement (HCU) for the pressure supply device DV1 with, for example, valves (V), solenoid valves (MV) and one or more pressure transducers (DG).

Housing B: comprises the open-loop and closed-loop control unit ECU without redundancy with a main plug connector or with partial or full redundancy with two plug connectors to the on-board electrical system.

Housing C: for master brake cylinder HZ with pedal stroke sensors and small sensor ECU and reservoir VB for variant e. The master brake cylinder HZ also comprises the pedal interface (PI) to the brake pedal and also the travel simulator with piston and spring.

The housing A (HCU) is preferably manufactured from an extruded molded piece, which is very highly suitable for fastening and assembly using calking technology. Here, the pressure supply DV1 with piston drive and ball-screw drive KGT is to be integrated with the motor, along with the valves and solenoid valves. The interface to the open-loop and closed-loop control unit ECU is also similar to ABS/ESP. The master brake cylinder HZ with all of the abovementioned components (housing C) can be screwed to housing A—this applies to all variants except for variants e and f. Here, the housing C is mounted, as a subassembly separate from the unit, onto the bulkhead, and the hydraulic line from the master brake cylinder HZ is connected to the housing A. In the variants a. and d., the reservoir VB is situated in the housing A with two connections to the brake circuits or with an additional connection to the pressure supply DV. The float in the reservoir VB comprises a target with a connection to the sensor element in the open-loop and closed-loop control unit ECU. The motor may preferably be connected to the housing A via an intermediate housing, which is preferably composed of plastic. The sensor required for commutation of the motor and piston position may preferably be attached to the motor housing on the side situated opposite the piston along the motor axis, and connected to the open-loop and closed-loop control unit ECU. Here, the sensor is situated in an additional housing in relation to the ECU. As redundancy for the electrical connection of the magnet coil of the solenoid valve, additional small circuit boards in relation to the main circuit board PCB may be used for a second connection of the magnet coil.

The illustrated packaging meets the requirements for modularity and small structural volume and is also very inexpensive in terms of costs and weight.

Through the provision of a special sensor housing, it is possible for the manufacturing-related tolerances of the housing of the unit according to the invention to be easily compensated, such that the motor sensor can be reliably placed at the position intended for it.

Furthermore, owing to a special design of the reservoir, its filler neck or opening may advantageously be arranged on or in front of the front side of the housing of the electronic control unit or the actuating device, so as to be easily accessible. Owing to the connection, which leads laterally past the housing of the electronic control unit, of the front filler neck to the rear of the housing of the control unit, the reservoir itself can expediently be arranged behind the control unit. The lateral or central region of the reservoir can advantageously be designed to be narrow, such that the actuating device is hereby no wider, or only insignificantly wider, than in the case of a conventional reservoir.

Each wheel brake is assigned a switching valve. If no additional outlet valves are provided, then for a pressure change in the respective wheel brake, the associated switching valve must be opened, wherein the pressure supply device builds up or reduces the pressure by corresponding movement of its piston. As soon as the pressure in the wheel brake has been set by closed-loop control, the associated switching valve is closed again and a pressure change can be performed in another wheel brake.

Through provision of at least one outlet valve for at least one wheel brake or one brake circuit, it is possible to provide a highly dynamic ESP and/or ABS function with only one pressure supply device, wherein the pressure is built up via the switching valves assigned to the wheel brakes. By means of the outlet valve assigned to a wheel brake, it is then possible, with the switching valves of the wheel brake closed, for the pressure to be reduced by dissipation directly into the reservoir, wherein, at the same time, a pressure change can be performed in another wheel brake or in the other brake circuit by means of the pressure supply device.

Figure 5:
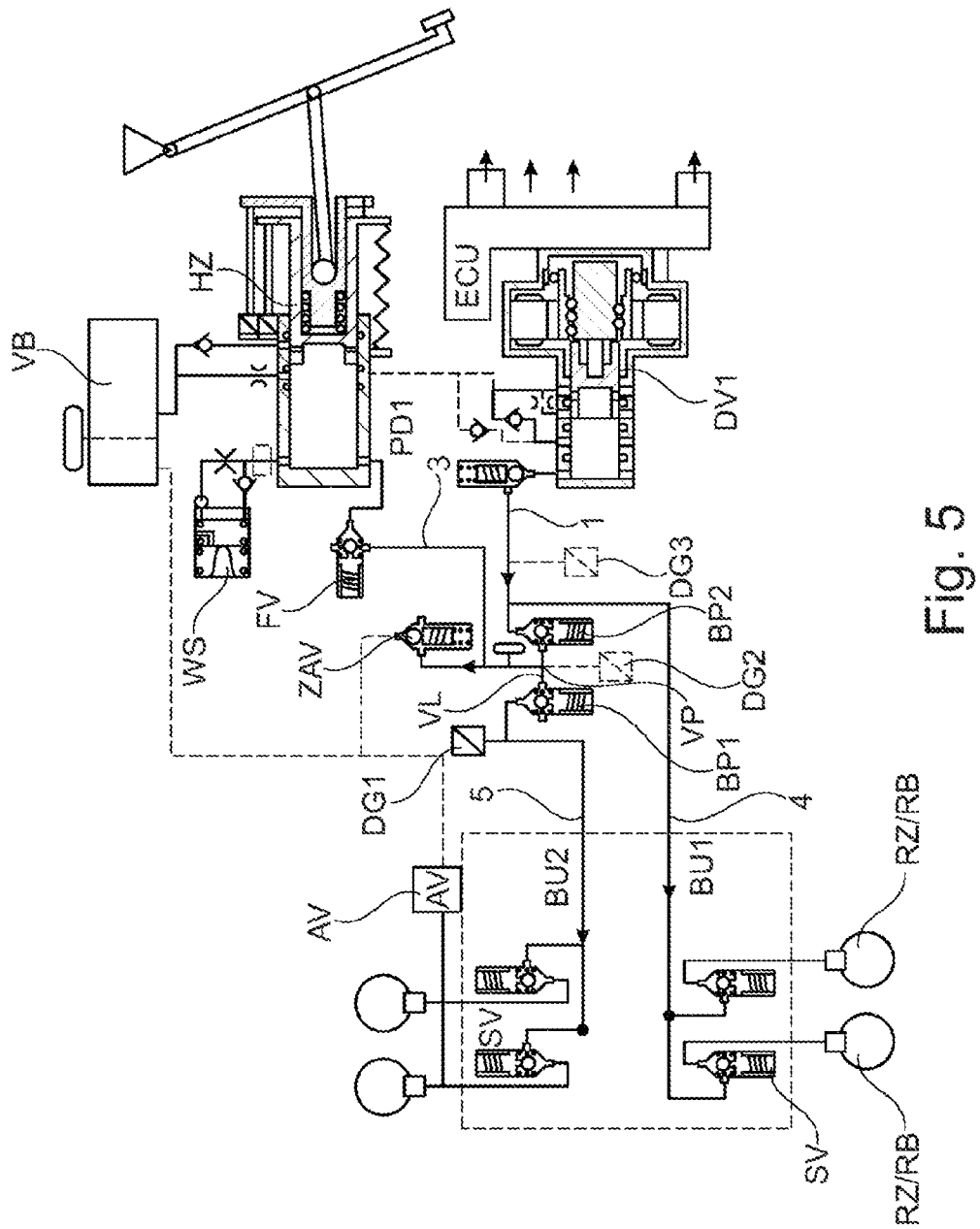

Outlet valves should be provided in particular on hydraulic consumers with large volumes (for example on wheel brakes of the front axle) or at a central point between isolation valves that isolate brake circuits (FIG. 5). Depending on the brake circuit configuration (diagonal or black/white), the outlet valves are arranged at different points in the hydraulic concept.

In brake force boosting operation and in recuperation operation, pressure is built up and reduced by means of the pressure supply by forward and backward movement of the piston; here, the outlet valves are operated so as to be closed. In closed-loop control operation, for example in the case of ABS, the multiplex method according to DE 102005055751 and DE 102009008944 A1 is primarily used, and the outlet valve(s) is/are used for pressure reduction only in the case of extreme dynamic requirements, wherein the pressure reduction is preferably performed with assistance of the signal of the pressure transducer. This means that the brake circuit is only opened to the reservoir in very few situations, which has decisive advantages in terms of reliability. Furthermore, the switching valves are arranged such that a pressure present in a wheel brake (RB) forces the valve control element of the switching valve (SV) away from its valve seat.

If additional volume is required for the pressure supply, volume is replenished from the reservoir to the brake circuit with the isolation valve of the pressure supply closed.

Different variants will be discussed in more detail below on the basis of drawings.

Figure 2A:
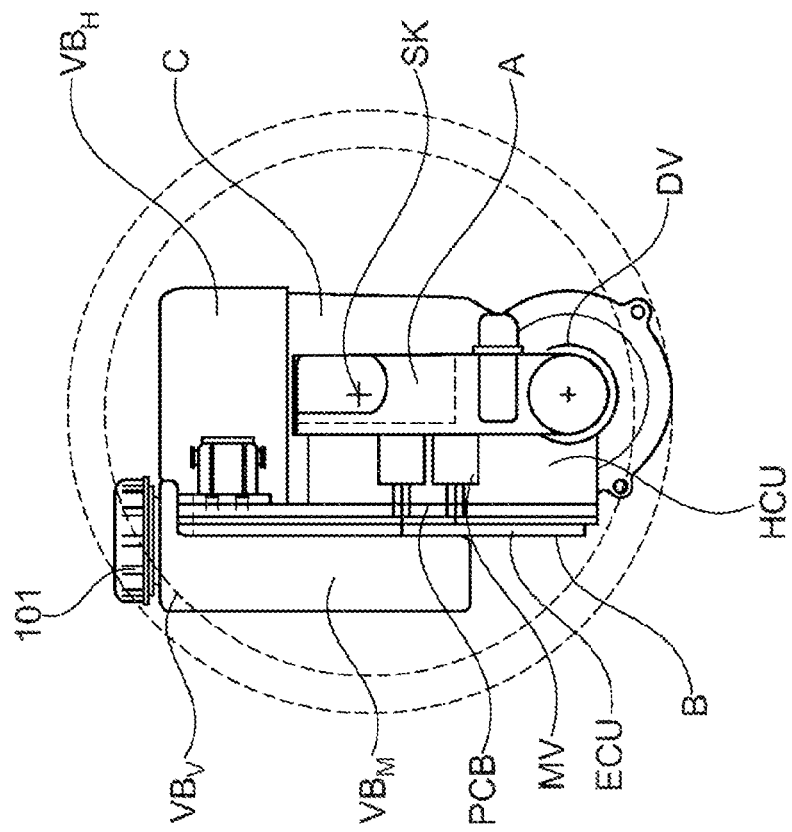
Figure 2:
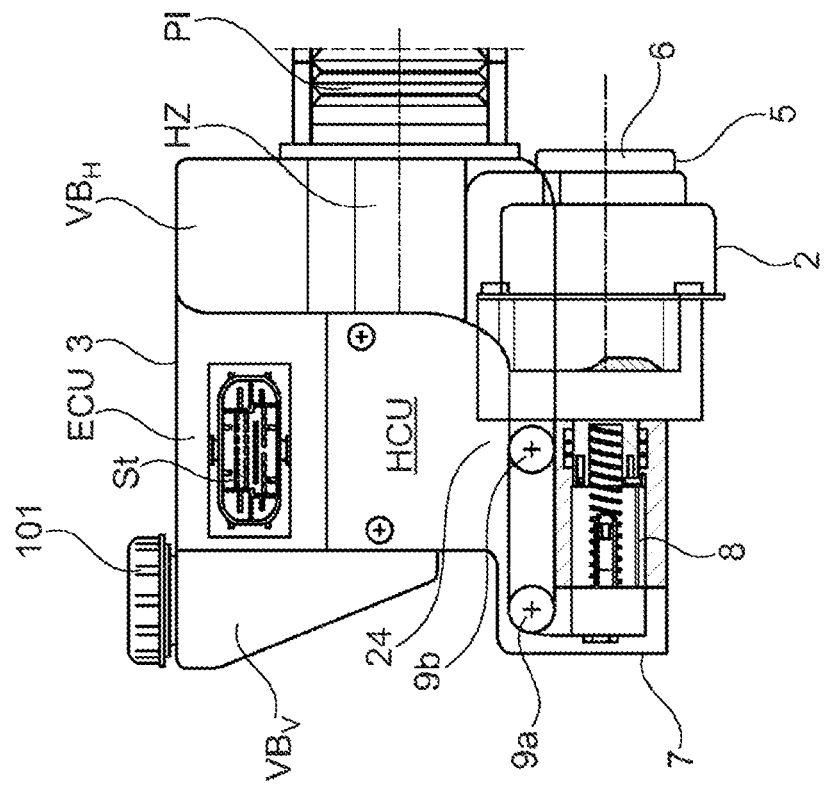
Figure 3:
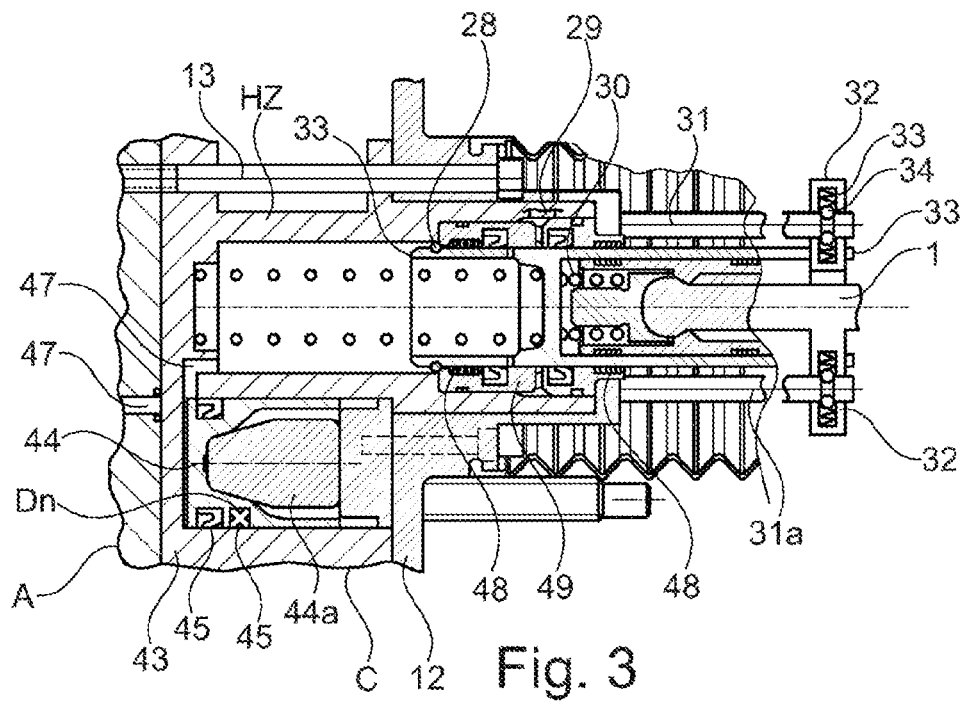
Figure 4:
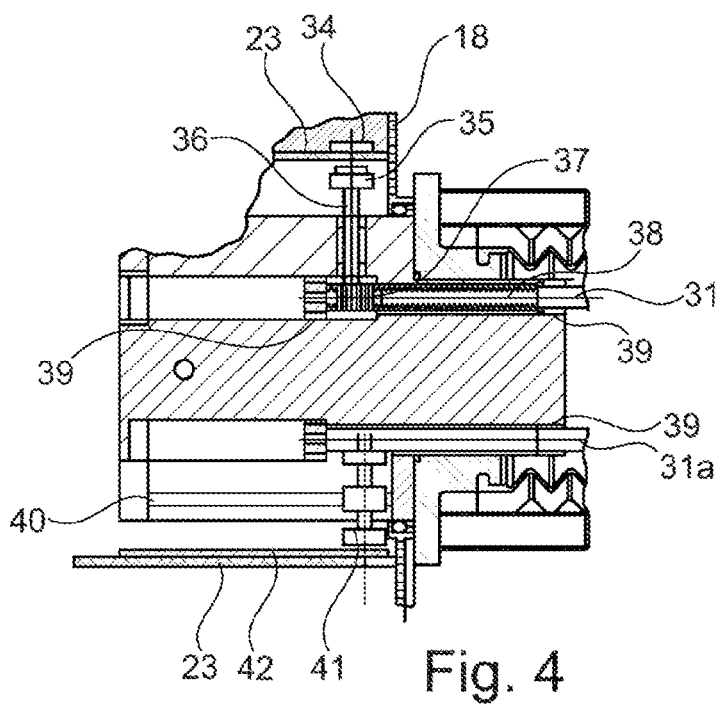
Figure 6A:
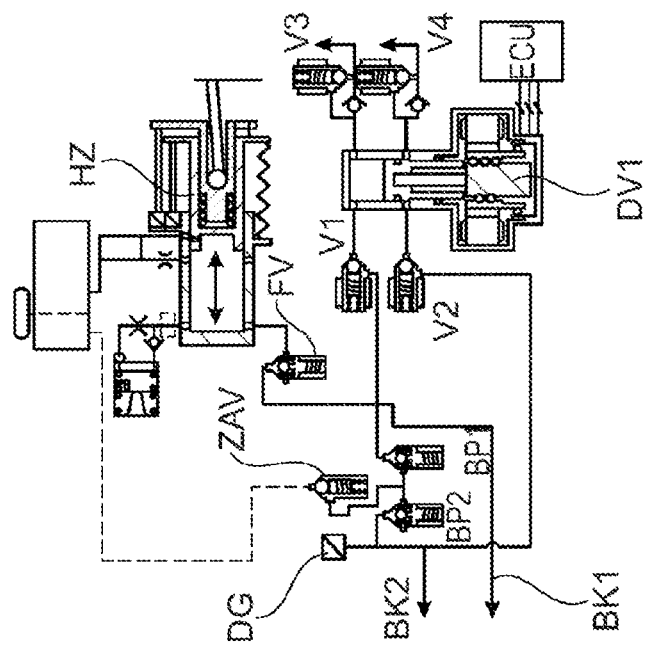
Figure 6:
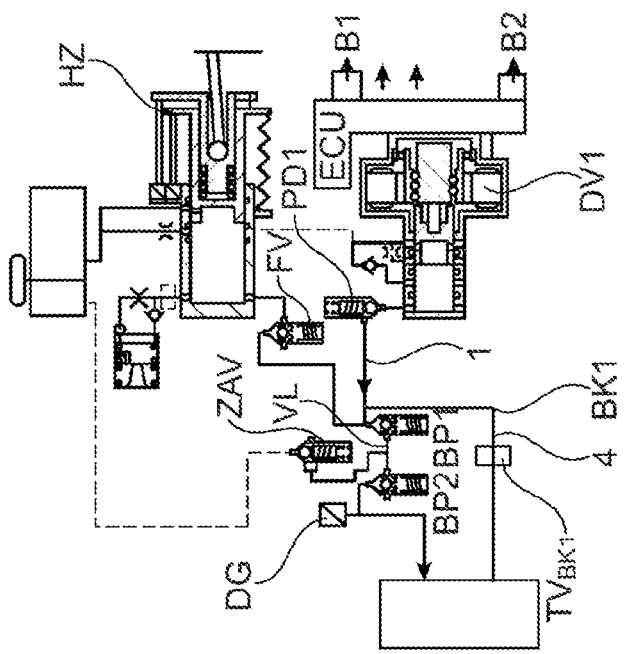
Figure 7:
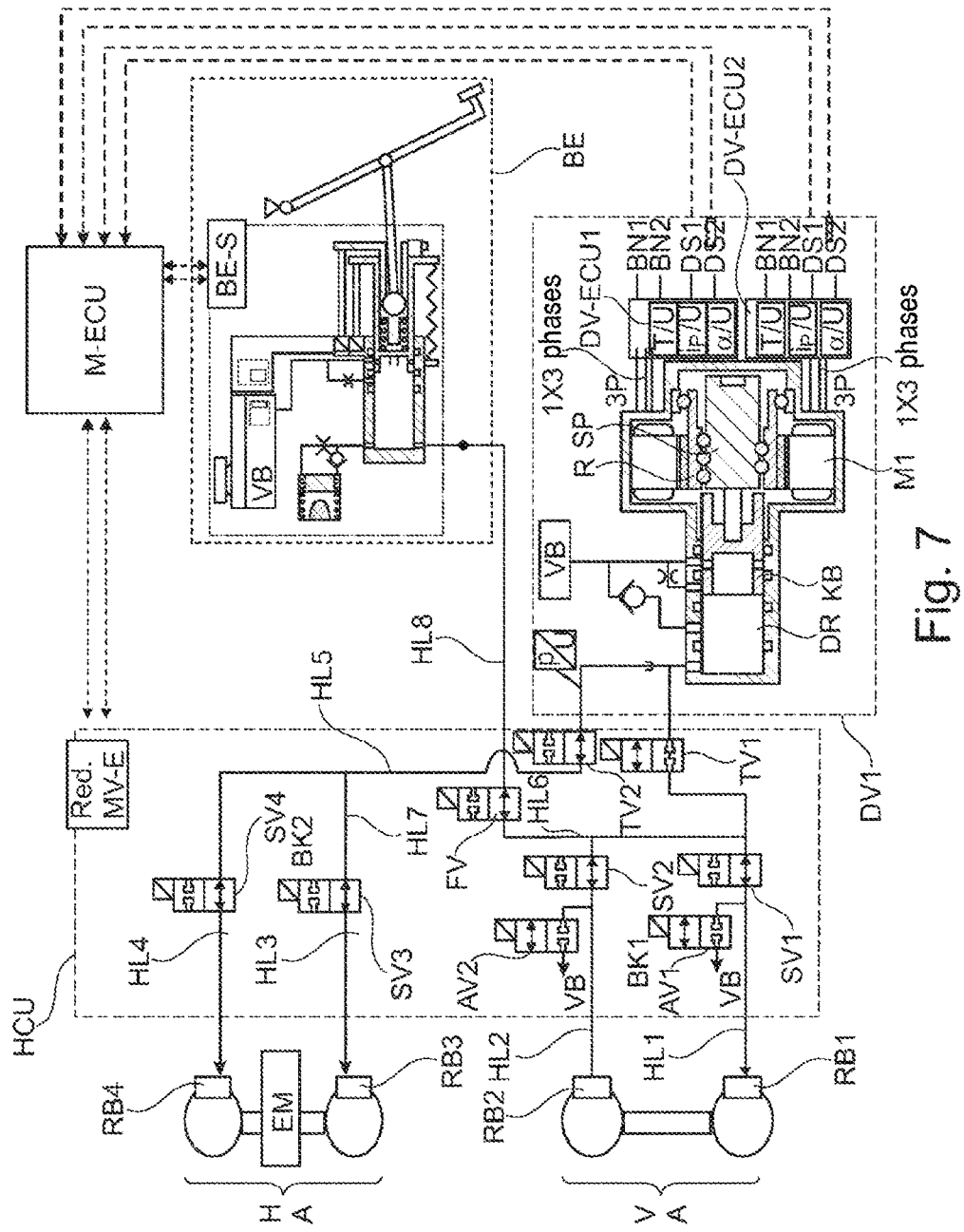
Figure 8:
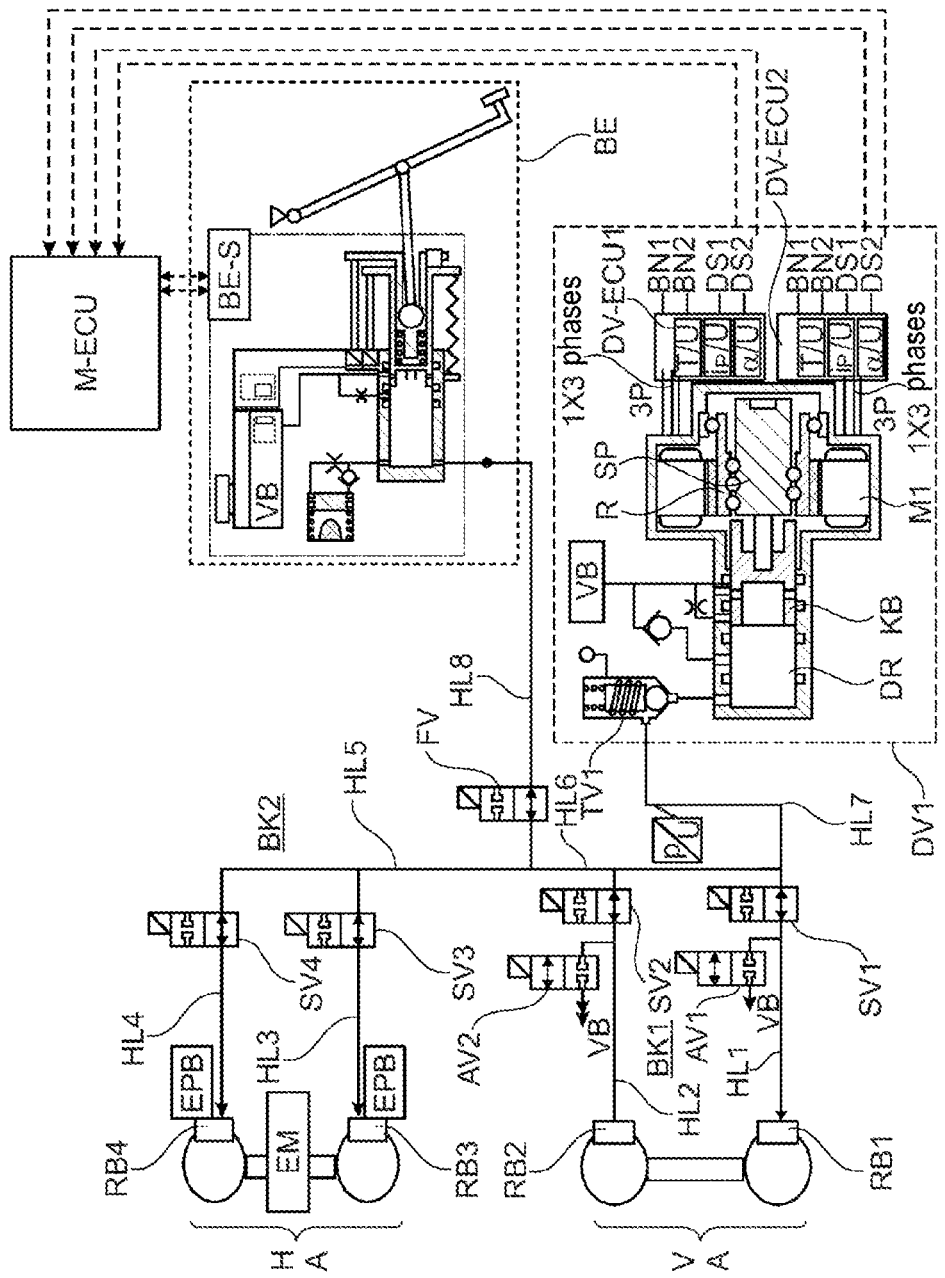
Figure 9:
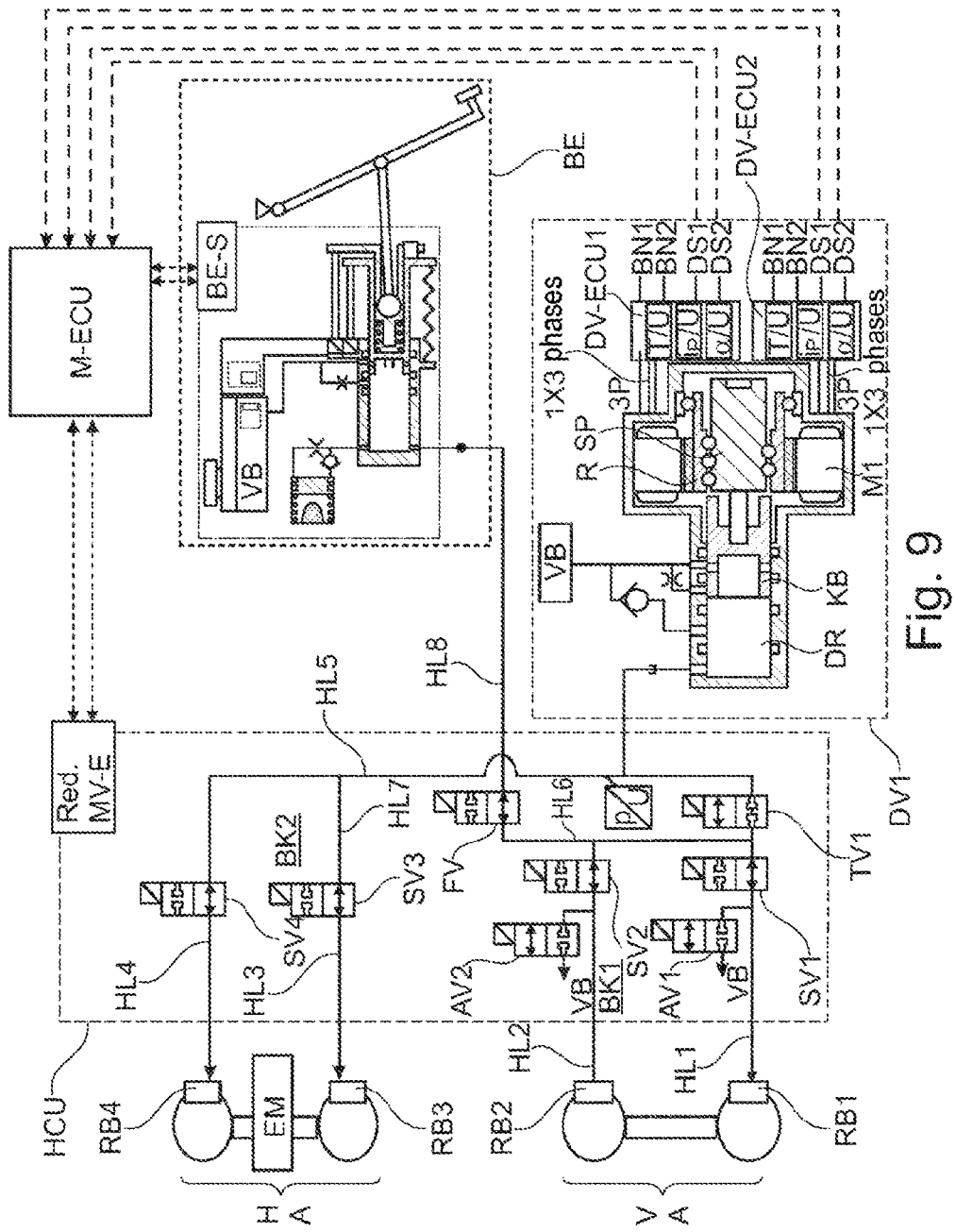
Figure 10:
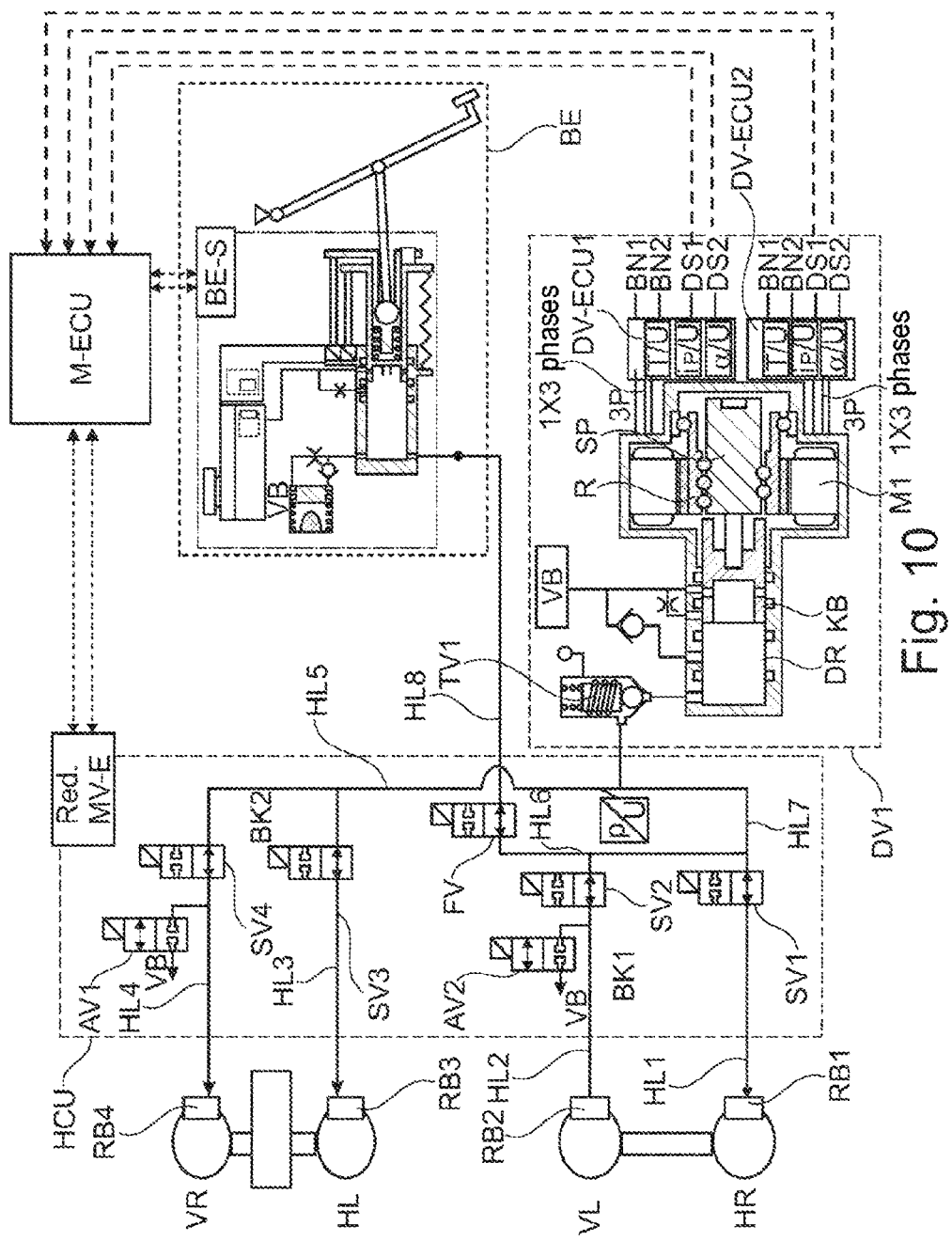
Figure 11B:
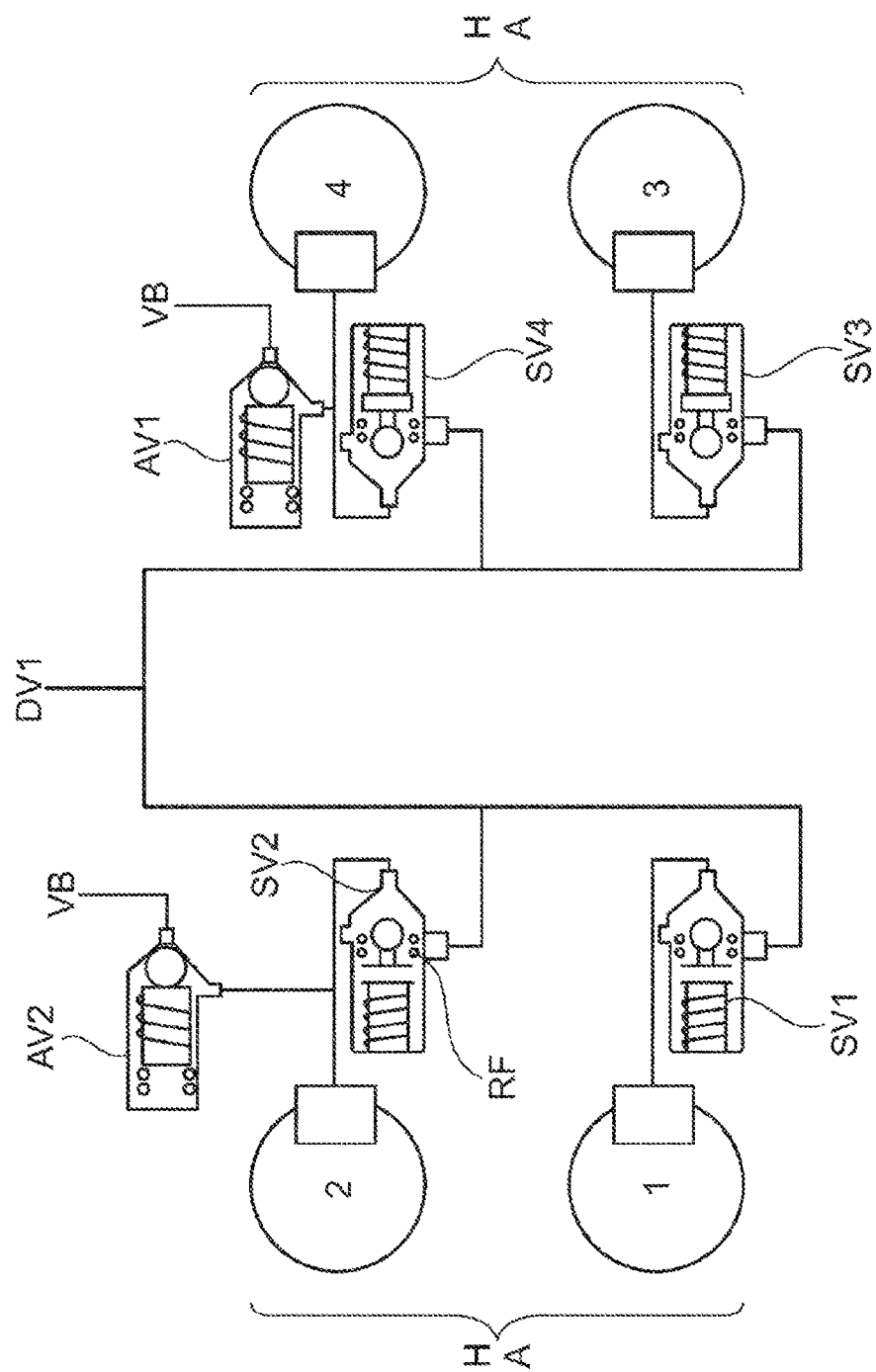

In the drawings:

FIG. 1: shows a side view of an integrated unit according to the invention with the housings A, B, C and reservoir VB and pedal interface (PI);

FIG. 1a: shows a cross-sectional illustration through the motor housing, the electronic control unit and the sensor housing;

FIG. 1b: shows a space-saving schematic configuration of a reservoir;

FIG. 1c: shows the reservoir as per FIG. 7 with schematically illustrated housing of the electronic control unit and the housing for the valve arrangement;

FIG. 2: shows an alternative embodiment regarding the design of the 1-box module as per FIG. 1;

FIG. 2a: shows a front view of the module illustrated in FIG. 2;

FIG. 3: shows a section through the master brake cylinder HZ, travel simulator WS and PI;

FIG. 4: is an illustration of the pedal stroke sensors;

FIG. 5: shows a possible embodiment of a hydraulic system according to the invention with a fail-safe valve arrangement for connecting the two brake circuits, with a master cylinder with an actuating device, and with only one pressure supply device with an electronic open-loop and closed-loop control device, as a so-called integrated 1-box system;

FIG. 6: hydraulic system with only one pressure supply, which however has a redundant motor controller;

FIG. 6a: shows the hydraulic system as per FIG. 6, but with a pressure supply device with double-stroke piston;

FIG. 7: is a schematic illustration of a possible embodiment of a brake system with wheel brakes at the front axle and rear axle, wherein an electric drive motor drives the rear axle;

FIGS. 8-10: show further variants of possible brake systems;

FIG. 11a: shows a black/white arrangement of the outlet valves;

FIG. 11b: shows a diagonal arrangement of the outlet valves.

FIG. 1 shows the side view of the integrated unit housing A with valve arrangement HCU, which contains the components solenoid valve MV, pressure transducer DG, piston for pressure supply device DV1 and fastening of the motor of pressure supply device DV1. The components, such as valves, solenoid valve MV and pressure transducer DG, are preferably fastened to an extruded or continuously extruded block 24, for example the solenoid valve MV preferably by calking or clinching, which also includes the seal thereof. In the lower part, the piston 8 of the pressure supply unit DV1 with a resetting spring and housing lid 7 is shown, which is for example preferably driven by means of the motor 2 by spindle and ball screw drive KGT (not illustrated). In the case of housing A, this is screwed to the HCU block 24 via an intermediate housing 3 by means of fastening screws. The reservoir VB2 is connected by way of two connections 9a and 9b to the brake circuits 1 and 2. As an extension of 9c, the suction valve SV for the pressure supply DV is positioned in the housing.

The reservoir VB has a filler neck $VB_V$ with a filler opening 100 which can be closed by means of a lid 101 and which extends in front of the housing of the ECU, wherein a central region $VB_M$ extends laterally on the housing of the ECU rearward to the rear side of the unit and opens out in a rear region of the reservoir $VB_H$, such that hydraulic medium can pass from the filler neck $VB_V$ into the rear region VBH.

On the opposite side, the sensor housing 3 with the rotational angle sensor is connected both to motor 2 and ECU 18 via a preferably flexible circuit board (not illustrated) with the intermediate housing. Attached on the top side of the open-loop and closed-loop control unit ECU are the plug connectors, which are implemented twofold in the case of the redundant ECU. In the variant with separate master brake cylinder HZ, the corresponding connecting line to the master brake cylinder HZ is provided at 11. The reservoir VB may, in the conventional manner, comprise a level sensor (NS) with a float, wherein the target with the sensor element are arranged in the open-loop and closed-loop control unit ECU, which is preferably of redundant configuration in the case of levels 4 and 5. In the fully integrated version, the master brake cylinder HZ is arranged behind the valve arrangement block HCU, which master brake cylinder is screwed to the HCU block 24 by means of fastening screws 13.

One important component of an electromotive drive is the motor sensor 34 for the electronic commutation and control of the position of the piston. The motor may be combined with different types of drive, for example transmission, trapezoid or spindle 57 with ball screw drive 58, as shown in FIG. 1a.

Different types of sensors, such as segment sensors with inductive or magnetic-field-sensitive sensors, may be used, or else sensors that are arranged on the motor or transmission axis. These sensors are particularly simple in terms of construction and are composed of a sensor target, for example in the form of a two-pole or multi-pole magnet, and a magnetic field-sensitive sensor element, for example in the form of a Hall sensor, GMR sensor, or the like. This sensor element 34 is electrically connected to the electronic control unit ECU, which is mounted either directly or via an intermediate housing on the motor. The sensor element 34 is preferably in a sensor housing composed of an outer housing part 52 and an inner housing part 52a and accommodates inter alia a circuit board 22, on which the sensor element 34 may be arranged.

According to the invention, an elastic part 61 is in order to manage the various installation tolerances between housing 18 of the electronic control unit ECU, the motor housing 62 and possibly also an intermediate housing (not illustrated) and the sensor housing 52/52a. In the extreme case, it is necessary here for tolerances in all three directions x, y, z to be compensated. This is achieved according to the invention by means of a corresponding construction and fastening of the sensor housing to the housing 18 of the electronic control unit ECU and to the motor housing. Here, the sensor housing is advantageously divided into two parts, an outer housing 52 and an inner housing 52a, wherein the housing parts 52, 52a are connected to one another by means of conventional connection techniques such as welding or adhesive bonding for example and are preferably manufactured from plastic. The sensor housing is furthermore fastened to the motor housing 62, preferably in two places. The sensor circuit board 22 is flexible in the upper part to the plug connector strip in order to manage the above-stated tolerances. A flex PCB (flexible circuit board), for example, is suitable for this. The electrical connection 22a from this flexible circuit board 22 to the main circuit board 23 of the electronic control unit ECU is preferably realized by means of the particularly fail-safe plug connector 51 with press-fit contacts. For assembly with the main circuit board 23, the housing 18 of the electronic control unit ECU has an aperture with a lid.

The sensor housing 52, 52a is connected and fixed to a projection of the ECU housing 18. Situated in-between is an elastic part 61, which may for example be a flexible elastic seal or a seal bellows. The elastic part is preferably designed as a lip seal. This flexible and elastic seal 61 thus serves for 3-axis tolerance compensation. The electrical connection from the motor winding to the circuit board 23 is realized by means of a conventional plug-in contact.

This sensor arrangement illustrated in FIG. 1a additionally allows the measurement of the rotor eccentricity, which acts on the spindle and generates transverse forces on the piston 8. A measurement means 53, which is arranged on the rotor or the spindle nut 56 and which in the simplest case is a measurement flange or a disk, is used for measuring the rotor eccentricity. The rotor eccentricity also acts in an axial direction and can be measured using laser technology. For this purpose, the outer sensor housing part 52a has an opening 152 in its lower region 52", which opening is closed by means of a closure plug 54 after the measurement. The surface of the measurement means 53 may, on its side facing toward the outer sensor housing part 52, have markings for the measurement, be provided with a coating and/or be profiled. The lower region 52" is fastened by means of a fastening screw 55 to the motor housing 62.

FIG. 1b shows a space-saving schematic configuration of a reservoir VB, which has a front region $VB_V$, a central region $VB_M$ and a rear region $VB_H$. The front region $VB_V$ has an upper filling opening 100 which can be closed by means of the lid 101. As illustrated in FIG. 1c, the reservoir VB engages around the housing B of the electronic control unit ECU at three sides, namely its front side ECU-V, its side wall ECU-S and its back or rear side ECU-H. The back of the ECU-H faces toward the bulkhead SW. Depending on the design of the unit, the reservoir VB, as illustrated in FIG. 7a, may also lie against or engage behind the rear wall of the housing of the valve arrangement HCU.

FIG. 2 shows a somewhat modified embodiment in relation to the unit illustrated in FIG. 1.

FIG. 2a shows the view from the front. It is shown here that the outline contour can still be accommodated within the small vacuum vac. of 8" and is thus suitable for installation on the bulkhead. The major advantage lies in the structural width of approximately 50% of the abovementioned brake force booster BKV, which is very favorable for right-hand and left-hand drive vehicles. The structural length of the abovementioned brake force booster BKV is also considerably shorter, and thus forms a basis for widespread use of the modular concept according to the invention. Here, again, the different housings A, B, C and VB must be provided. The housing B is situated for example behind the HCU block 24, and is screwed to the latter and sealed off, as in the case of ABS.

For cost reasons, it is advantageous to provide a 1-part circuit board PCB. For the case of an ingress of water, the circuit boards PCB may be separated by webs with seals in the housing of the open-loop and closed-loop control ECU with the two redundant circuits. Possible conductor track cracks are also advantageously covered or ruled out by redundancies. The remaining electronic connections from the motor to the circuit board PCB are also of importance.

FIG. 3 shows the master brake cylinder HZ with housing, in which the master brake cylinder (HZ) piston 33 and travel sensor (WS) piston with spring for the opposing force and pedal characteristic are installed. The travel simulator piston may also be accommodated in block A or housing A. The piston likewise has redundant seals 45 with throttle Dr to the interior. In the event of failure of the seal 45, the failure is identified by way of the leakage flow, and the failure is not relevant. This throttle Dr with small leakage flow allows diagnosis of the failure of the first seal. The travel simulator piston is supported on the flange 12 and therefore does not require a separate closure piece. The master brake cylinder (HZ) piston 23 with resetting spring 50 is arranged in parallel with respect to the travel simulator piston. The piston may be guided in slide rings 48 with low friction, and the sealing action of the piston is also impaired to a lesser extent in this case. Preferably, for the slide rings and seals, use is made of a separate bearing part 49, which is supported on the flange, and also the stop of the piston 23 by means of stop ring 28. A force-travel sensor KWS 30 may be arranged in the master brake cylinder (HZ) piston for the diagnosis of the travel simulator WS. The sensor rods 31 and 31a are connected to the piston 23 and to the pedal plunger. These rods are connected by way of a detent coupling 32-34, in each case to piston and pedal plunger. This coupling is composed of a ball 34 with a spring 33 in the housing 22. This prevents blockage of the pedal plunger in the event of jamming of one sensor rod.

FIG. 4 shows the arrangement of two alternative possible embodiments of the pedal travel sensors. The first variant with toothed rack 38, toothed gear 37, drive shaft 36 to the target 35 and sensor element 34 on PCB 23 has already been described in DE102015104246. This version requires little installation space and is inexpensive. In the lower variant, a guide part 39 is pressed, for example with a pin, into the sensor rod. This is guided in the upper part in a guide strip 40, in order that an angular rotation that acts on the target 41 is small. This target acts on an inductive sensor 42 with an evaluation circuit, and is connected to the main PCB 23 and is situated in the ECU housing 14.

For the above-described variants a to f, the following components may advantageously be of identical design:
  Pressure supply device DV1: for all variants a to f;
  Pressure supply device DV2: for all variants with redundant pressure supply;
  HCU/ECU: for the two variants without redundant pressure supply;
  Master brake cylinder HZ and travel sensor WS: separate and integrated with pedal sensors for five of the six variants, with the exception of variant f. without master brake cylinder. Separate master brake cylinder HZ but with additional reservoir VB.

Solenoid valve MV: for all variants
Motor sensor: for all variants.

Aside from the electric pedal corresponding to system f., all components are modular. The manufacturer and user thus have a modular system (OEM)—an excellent basis inter alia for minimizing costs.

FIG. 5 shows the basic elements of a closed-loop-controllable brake system composed of master brake cylinder HZ with travel simulator WS and reservoir VB, a pressure supply devices DV1, wherein the pressure supply device DV1 has electromotive piston control. The pressure supply device DV1 acts together with a valve circuit at the wheel brake cylinders RZ, which transmit the closed-loop-controlled wheel pressure, for example in the case of ABS, to the brake. This corresponds to the prior art. By means of the one pressure supply device DV1, the pressure can be set by closed-loop control in both brake circuits BK1 and BK2 via the two connecting valves BP1 and BP2.

It is however the intention for the hydraulic system according to the invention to have a high level of fail safety for semi-automatic (SAD) or fully automatic (FAD) driving.

For this purpose, all failure-relevant components should be taken into consideration, such as valves, sensors, seals, motors and brake circuits. The following components or hydraulic connections should therefore advantageously be designed to be fail-safe:

(1) connection from the pressure supply device DV1 provided for the first brake circuit to the second brake circuit BK2;

(2) connection from the pressure chamber of the master brake cylinder HZ via the valve FV to the brake circuits BK1, BK2 via the valves BP1 and BP2;

(3) connection of valve PD1 and valve BD1 to the wheel brake cylinders RZ via the respective switching valves SV assigned to the wheel brakes;

(4) connection of valve BD2 to the wheel brake cylinders RZ via the respective switching valves SV assigned to the wheel brakes;

(5) connection from a brake circuit BK1, BK2 to the reservoir VB;

(6) connections between brake circuits BK1, BK2 to the wheel brake cylinders RZ.

These hydraulic connections, with possible failure-inducing faults of the individual components, will be described below.

The pressure supply device DV1 acts from the brake circuit BK1 into the brake circuit BK2 via the hydraulic lines 1, 2 and 5 via the switching valves SV to the wheel brakes RB. In the prior art, only a single bypass valve is used for this purpose. Here, a valve failure can cause a total brake failure if there is also a dormant fault in a further valve. The invention therefore provides two redundant valves BP1 and BP2 in order to allow the connection to the brake circuit BK2 from the first pressure supply device DV1. Dormant faults of the valves BP1 and BP2 are identified by the pressure transducer by virtue of the valves being short-circuited in the event of a change in pressure. In this phase, the pressure must remain constant. In the event of failure of the first pressure supply device DV1, for example in the event of failure of a piston seal, the imparting of a reaction to the brake circuit BK2 via the three redundant valves BP1, BP2 and PD1 is prevented. The valves are preferably valves which are open when electrically deenergized, in order that, in the event of failure of the pressure supply device DV1, the master brake cylinder HZ can act on both brake circuits BK1 and BK2. If the pressure is reduced by way of the opening of the valves ZAV or FV, the two connecting switching valves open automatically, without dedicated electrical actuation thereof, owing to the acting pressure difference.

The pedal movement is measured by means of redundant pedal travel sensors (PS), which also act on a force-travel sensor (KWS) measuring element according to WO2012/059175 A1. The pressure supply device DV1 is controlled with the signal from the pedal travel sensors, wherein the piston control causes the volume flow in the hydraulic main line 1 in the brake circuit BK1 and via the redundant valves BP1 and BP2 into the brake circuit BK2. The master brake cylinder HZ can be connected via the line 3 to the brake circuits BK1 or BK2, wherein the valve FV is arranged in the line 3 for the purposes of closing same. This connection is effective only in the fall-back level. If the line is connected to the connecting line of the two switching valves BP1 and BP2, the two valves BP1 and BP2 form a further redundancy. A conventional connection from the valve FV directly into one of the two brake circuits BK1, BK2 would, in the case of a leaking valve FV, have the result that the brake circuit and thus the pressure supply act on the master brake cylinder (HZ) piston, which conventionally leads to the pressure supply being shut off.

Various pressures or pressure levels from the master brake cylinder and from the brake circuits BK1 and BK2 act on the valve FV. In the worst case, this can have the result, for example in the event of failure of the on-board electrical system or of the open-loop and closed-loop control unit ECU, that an unfavorable pressure difference prevails at the closed valve FV and the valve FV cannot open, such that a pressure reduction $P_{reduction}$ is not possible. In order to prevent this, a further switching valve may be connected in parallel with respect to the valve FV, wherein the outputs and inputs of the valves are connected to the line 3 in an interchanged manner, such that, in the presence of any pressure differences, it is ensured that at least one of the two valves opens automatically, that is to say even without electrical energization, owing to the pressure difference. Furthermore, this advantageously reduces the back pressure on the valves. In the event of failure or leakage of the valve FV, the travel simulator WS does not fail.

In the event of a failure of a brake circuit in the wheel cylinder, the corresponding inlet valve EV or switching valve SV is conventionally closed in order that the failed wheel circuit is eliminated. A leaking inlet valve EV/switching valve SV (dormant fault) causes the brake circuit or the entire pressure supply to fail. Here, too, the valves BP2 and BP1 provide additional safety, such that the pressure supply does not fail. A failure of the brake circuit BK1 owing to a non-functioning switching valve SV means a failure of the pressure supply DV1, whereby the pressure supply to all still-functioning wheel brakes is performed by means of the other pressure supply device DV2.

When the pressure supply is active, the pressure build-up is always performed by means of the pressure supply. Either the pressure supply or the central outlet valve ZAV can be used for the closed-loop ABS control or for the pressure reduction by means of the pressure supply device DV1. The pressure reduction is then performed by backward movement of the piston of the pressure supply or by PWM operation of the central outlet valve ZAV. The pressure signal of the pressure transducer can be used to improve the closed-loop control quality in the pressure reduction via the central outlet valve ZAV. However, it is likewise possible to provide an outlet valve AV as an alternative or in addition to the central outlet valve ZAV for at least one wheel brake; the outlet valve AV is preferably used at the wheel brakes with a large volume, that is to say front wheel brakes. Thus, instead of one outlet valve, use may also be made of two outlet valves AV (not shown). Also, as is conventional in standard ABS systems, an outlet valve AV may be provided for each brake circuit, such that the pressure in this brake circuit is reduced via the outlet valve AV and, at the same time, the pressure is built up/reduced in the other brake circuit by means of the pressure supply device DV1. Here, the volume flow additionally passes via the valves BP1 or BP2, such that a leaking central outlet valve ZAV is not critical for normal operation because, in the event of failure of the central discharge valve ZAV, the pressure control is performed by means of pressure supply device DV1. Furthermore, the fault, even dormant, is identified by central outlet valve ZAV immediately from a change in pressure or increased volume delivery of the pressure supply device DV1. For extreme safety requirements, a further discharge valve may be connected in series with the outlet valve ZAV.

Failures in the master brake cylinder HZ and travel simulator WS are normally caused by the seals. In the case of the master brake cylinder HZ, an additional seal D3 with a throttle may be used in the return line to the reservoir VB in order to be able to diagnose the failure of a seal at an early point in time. A leak can thus be identified by means of the pedal stroke sensors from a small additional pedal movement. The low loading in the case of SAD and FAD must be taken into consideration.

In many systems, for the diagnosis of the seals, a solenoid valve which is open when electrically deenergized is incorporated in the return line, which solenoid valve is closed for the purposes of diagnosis. In this case, pressure is conducted into the master brake cylinder HZ from the pressure supply device DV1 via the valves PD1, BP1 and EV. The diagnosis is performed by way of a pressure change at a constant piston position, or a change in the piston position at a constant pressure. As an alternative, a combination of throttle and check valve may also be used to save costs. The throttle is dimensioned such that a leakage flow through the seal leads to only a slight lengthening of the pedal within a normal braking time of approximately 10 seconds.

The same solution is also used in the case of the WS piston with redundant seal, with diagnosis, as above for seal D3, by way of the pedal movement. Furthermore, control of the brake boosting remains possible even with these failed seals, albeit with a changed pedal characteristic. Here, too, there is an extremely low failure rate for the failure of two seals, almost in the range of $<10^{-10}$/year. The pressure supply device DV1 may also be equipped with redundant seals, as described above in the case of the master brake cylinder HZ, with seal D6, with a throttle between seal D6 and seal D5. If the suction valve is connected directly to the connection on valve PD1, then the suction commences immediately with the return stroke of the piston, with the advantage that a high suction power is provided even at low temperatures. A failure or leakage of the switching valve SV causes failure of the pressure supply DV in limit cases. A compromise lies in the connection of the switching valve SV at approximately 60% of the stroke. This means that 40% of the stroke is possible without the effect of a leaking switching valve SV, and at the same time a suction action is possible in the normal temperature range. With the small restriction mentioned above, the volume delivery of the piston is ensured by redundancy. Furthermore, the motor may be controlled by means of a redundant 2×3-phase winding, such that the pressure supply devices DV fail only as a result of a blocking ball-screw drive KGT.

The ABS function by means of multiplex operation MUX and the pressure supply device DV1 is performed as described in WO 2006/111393 A1. Extended MUX functions result from a central discharge valve ZAV. If, during the pressure build-up $P_{build-up}$ in the brake circuit BK1, a pressure reduction $P_{reduction}$ is necessary at the same time in the other brake circuit BK2, this is performed by means of the central discharge valve ZAV and simultaneously closed valve BP1. In this way, the multiplex system MUX is subjected to load only by two wheel brakes RB1, RB2 in the brake circuit BK1, that is to say a pressure build-up $P_{build-up}$ and pressure reduction $P_{reduction}$ cannot take place in the wheel brakes RB1 and RB2 of the brake circuit BK1 simultaneously. Alternatively, a discharge valve AV1, AV2 in the respective brake circuit may be used for the purposes of pressure reduction $P_{reduction}$ in order to relieve the MUX of load. Here, the discharge valve AV may be arranged or connected either between the switching valve SV and a connecting switching valve BP1, BP2 or else between the wheel brake and the associated switching valve SV, such that a direct pressure reduction $P_{reduction}$ can take place by dissipation via the discharge valve to a reservoir VB. This is expedient in particular for the pressure reduction $P_{reduction}$ in the front wheels. The central discharge valve ZAV is not required in this alternative.

What is typical for the abovementioned MUX operation is the closed-loop pressure control, also in the case of ABS, by means of the volume measurement and by means of the piston movement of the pressure supply device DV1, also taking into consideration the pressure-volume characteristic curve (p-V characteristic curve). A metering of volume for the pressure build-up is thus also possible. Here, in the case of the pressure build-up $p_{build-up}$, a serial and non-simultaneous pressure build-up $p_{build-up}$ in the individual wheel brakes is advantageous. Here, the valve dimensioning and the back pressure on the valve must be taken into consideration, in particular in the case of the valves BP1 and BP2 in the case of rapid pressure build-up in the wheel circuits. The back pressure of the abovementioned valves acts as a pressure difference between the brake circuits BK1 and BK2.

The open-loop and closed-loop control device ECU is a constituent part of the entire system and of the packaging. A redundant or partially redundant ECU is required for failsafe functioning. This partially redundant ECU may also be used in addition to the redundant ECU for particular functions. In any case, the valves are or should be driven redundantly by means of separate valve drivers and isolation switches, which shut off a failed valve driver.

A redundant on-board electrical system connection is also necessary for the redundancy of the open-loop and closed-loop control device ECU. A connection with 48V may also be used for the connection of the motors. The advantage of 48V is higher dynamics. In the event of failure of the motor of the pressure supply device DV1 at 48V, emergency operation with 12V with approximately 50% power is realized with reduced dynamics and cost savings. For this purpose, a configuration of the motor for 24V, for example, is necessary.

A pressure transducer DG is preferably used in brake circuit BK2, and possibly also in brake circuit BK1. In the event of failure of the pressure transducer, closed-loop pressure control can be performed by way of the current measurement of the motors and position control of the piston using the p-v characteristic.

The pressure transducer DG1 may be arranged as illustrated in FIG. 5. It may however alternatively also be replaced or supplemented by one of the two pressure transducers DG2, DG3 illustrated using dashed lines. The pressure transducer DG2 should advantageously be used to measure the pressure in the connecting line VL. In this way, it is advantageously possible, during the pressure reduction $P_{reduction}$ in the brake circuit BK2, for the pressure to be controlled by way of the outlet valve AV and the pressure transducer DG2 if the pressure supply device DV1 performs the closed-loop pressure control in the brake circuit BK1 for example by means of a multiplex method.

If two pressure supply devices DV1 and DV2 are used, the pressure change can be controlled in the brake circuit BK2 by means of the pressure transducer DG2 and the second pressure supply device DV2, which is connected directly to the line 5, if the two connecting valves BP1 and BP2 are closed. The pressure supply device DV1 then performs control for example by way of volume and current measurement. A calibration may for example be performed whenever when the pressure supply device DV1 performs the pressure change in both brake circuits BK1 and BK2.

The embodiments illustrated in FIGS. 6 and 6a are slightly modified in relation to the embodiment illustrated in FIG. 5.

In the embodiment as per FIG. 6, an isolation valve TVBK1 is arranged in the line 4 in order that the brake circuit can separately once again be isolated of the pressure supply DV1.

FIG. 6a shows the application of a 2-circuit double-action piston, the forward stroke of which feeds brake circuit BK1 via valve V1, and the return stroke feeds the brake circuit BK2 via valve V2. Both circuits of the double-action piston DHK can feed into the respective other brake circuit BK via the valves BP1 and BP2. As is known from WO2016/023994 A1 and WO2016/023995 A1, the volume of the double-action piston DHK must, for the $P_{reduction}$, be discharged via the valves V3 and V4 in the reservoir VB.

FIG. 7 is a schematic illustration of a possible embodiment of a brake system with wheel brakes RB1 and RB2 at the front axle VA and the wheel brakes RB3 and RB4 at the rear axle, wherein an electric drive motor EM is provided for driving the rear axle HA.

The brake system only has a single pressure supply device DV1, one actuating device BE, and one superordinate open-loop and closed-loop control unit M-ECU. The pressure supply device DV1 has two mutually independent open-loop and closed-loop control units DV-ECU1 and DV-ECU2, each of which controls in each case one of the two winding or phase systems of the drive motor of the pressure supply device DV1, which are formed here by 3-phase systems. Additionally, redundant signal lines DS1 and DS2 may be provided.

Switching valves are provided for the connection and isolation of the pressure supply device DV1 to and from the wheel brakes. The dashed lines illustrate signal transmission lines which connect the control unit M-ECU to the components of the brake system.

The traction motor EM communicates with the control unit M-ECU and can be used for driving and also for braking the rear axle VA.

A pressure supply device DV1, which has an electromotive drive M1 which is controlled by the open-loop and closed-loop control device DV-ECU, is used for the pressure build-up in the hydraulically acting wheel brakes RB1-RB4. Additionally, the pressure supply device DV1 may also have a motor current measuring device i/U, at least one temperature sensor T/U and a rotor angle encoder α/U, the signals of which can be used for the closed-loop pressure control. The motor M1 drives, via a spindle drive, a piston KB which is mounted displaceably in a cylinder of the pressure supply device DV1 and which delimits a pressure chamber in order to build up, hold or reduce a pressure there. The pressure chamber is connected via a hydraulic line to the isolation valves TV1, TV2. Owing to the two isolation valves connected upstream of the pressure supply DV1, a brake circuit failure does not cause a total failure of the brake system. In the event of failure of the brake circuit BK1, braking force can still be generated in the brake circuit BK2 by means of the pressure supply and the electric motor EM. If brake circuit BK2 fails, braking force can be generated in the brake circuit BK1 (front axle) by means of the actuation unit by the driver or the pressure supply DV1. In this way, the legal requirements for the minimum deceleration can be satisfied even in the event of a brake circuit failure. Since the pressure supply is furthermore of redundant configuration, a high level of availability can be achieved. A residual risk lies in the jamming of the spindle drive, which must be safeguarded against by means of corresponding quality measures. The pressure in the hydraulic line can be ascertained by means of the pressure transducer p/U. The closed-loop pressure control may be performed either with the aid of the pressure transducer p/U. The closed-loop pressure control may also be performed by way of the current measurement by means of the motor current measuring device i/U and the angle transducer α/U and a stored pressure-volume characteristic curve, because the motor torque is proportional to the pressure in the pressure chamber and also proportional to the motor current i. The motor M1 has two mutually separate winding systems with 2×3 phases. The number of phases may self-evidently be changed according to the respective requirements. If one winding system fails, the motor M1 can still be operated with reduced power. This already creates a substantial redundancy. The open-loop and closed-loop control device DV-ECU may likewise be of redundant configuration, such that, for example, in each case one independent open-loop and closed-loop control device DV-ECU1 and DV-ECU2 may be provided, which controls in each case one phase system of the motor M1. Thus, even in the event of failure of one open-loop and closed-loop control device DV-ECU1 or DV-ECU2, the brake system can still be operated safely.

By means of the isolation valves TV1, TV2, the pressure supply device DV1 can be selectively connected to or isolated from the hydraulic line HL6 or the first brake circuit BK1. The hydraulic lines HL1 and HL2, which are connected to the wheel brakes, can be selectively connected to the hydraulic line HL6 by means of switching valves SV1 and SV2. If a pressure is now to be built up in the wheel brake RB1 of the front axle VA, this is performed via opened valves TV and SV1, wherein the valves AV1, SV2 and FV are closed and the piston KB is adjusted by means of the motor M1. For the pressure reduction in the wheel brake RB1, the piston KB can, with the same valve switching configuration, be moved backward, or else the outlet valve AV1 is opened, whereby the pressure in the wheel brake RB1 can be reduced by dissipation into the reservoir VB. The pressure build-up in the wheel brake RB2 takes place analogously. The pressure in the wheel brakes RB1 and RB2 may self-evidently also be built up and reduced simultaneously. Also possible is a pressure build-up in one wheel brake by means of the pressure supply device DV1 and, at the same time, a pressure reduction in the other wheel brake via the associated outlet valve AV. In the case of a pressure build-up only in the wheel brakes RB3 and RB4 of the second brake circuit BK2, either the isolation valve TV and/or the switching valves SV1 and SV2 must be closed and the respective switching valve SV3 or SV3 must be open. Should the pressure supply device DV1 fail, a pressure can be built up in one or both brake circuits by means of the actuating device BE. For this purpose, the actuating device BE has a brake pedal which acts on a piston which delimits a pressure chamber, wherein the piston then forces hydraulic medium out of the pressure chamber into the brake circuit(s), whereby a brake pressure is built up in one or all of the wheel brakes. For this purpose, the switching valves are preferably designed as valves which are open when electrically deenergized.

FIG. 8 shows a further possible variant, wherein, by contrast to FIG. 7, only one isolation valve TV1 is provided, which is arranged in the housing of the pressure supply device DV1. Additionally, electric parking brakes EPB are provided at the rear axle HA as a further option for generating braking torque in the event of a fault. In the event of failure of the pressure supply DV1, a pressure can be built up in the wheel brakes RB1-RB4 in both brake circuits BK1 and BK2 by means of the master brake cylinder HZ via the valve FV, which is open when electrically deenergized. If one wheel circuit fails, the respective switching valve assigned to the leak must be operated so as to be closed, in order that this does not lead to a total failure of the brake system.

FIG. 9 shows a variant in which likewise only one isolation valve TV1 is provided, such that, by contrast to the variant in FIG. 8, a pressure can be built up only in the brake circuit of the front axle VA by means of the master brake cylinder HZ if the pressure supply device DV1 fails. In this variant, the isolation valve is accommodated in the valve arrangement HCU. By contrast to FIG. 8, the failure of the pressure supply is not too critical, because an electric traction motor EM is available in the brake circuit BK2, and the actuation unit with master brake cylinder HZ is available in the brake circuit BK1, in the event of failure of the pressure supply DV1.

FIG. 10 shows a variant in which no electric motor is arranged at one axle, and only one isolation valve TV1 is provided. Thus, as in the variant of FIG. 9, pressure can be built up in the wheel brakes RB1 and RB2 only in the brake circuit BK1 of the front axle VA by means of the master brake cylinder HZ in an emergency situation, because the isolation valve TV1 is closed in this case in order to decouple the pressure supply device DV1 from the brake circuits. In order that the ABS and/or ESP function can also be provided, an additional outlet valve AV1 is provided at the wheel brake RB4 of the rear axle HA, via which additional outlet valve the pressure in the wheel brake RB4 can be reduced by dissipation directly into the reservoir VB.

FIGS. 11a and 11b show an advantageous connection of the switching valves SV which ensures that the switching valves SV reliably open in the case of a pressure being confined in the wheel brakes. For this purpose, the switching valves with their connections assigned to the valve seat are connected to the working chambers of the wheel brakes, such that the pressure confined therein pushes the valve control element away from the valve seat of the switching valve SV. FIG. 11a shows the black/white arrangement and FIG. 11b shows the diagonal arrangement of the outlet valves AV1 and AV2 assigned to the wheel brakes.

LIST OF REFERENCE DESIGNATIONS

HZ Master brake cylinder (single)
$a_{HZ}$ Main axis of the master brake cylinder
$a_{DV1}$ Axis of the first pressure supply device DV1
$a1_{DV2}$ Horizontal orientation of the axis of the second pressure supply device DV2 perpendicular to the axis $a_{DV1}$ of the first pressure supply device DV1
$a2_{DV2}$ Vertical orientation of the axis of the second pressure supply device DV2 perpendicular to the axis $a_{DV1}$ of the first pressure supply device DV1
DV Pressure supply
HCU Hydraulic control unit
ECU Electronic computing unit
ECU-V Front side of the ECU
ECU-S Side wall of the ECU
ECU-O Top side of the ECU
ECU-H Rear side of the ECU, facing the bulkhead of the vehicle
EM Electric drive motor
PI Pedal interface
SW/H Bulkhead/bracket
St Plug connector
BKV Brake force booster
NS Level sensor
RZ Wheel cylinder
MV Solenoid valve
Dr Throttle
SV Suction valve of pressure supply device DV1
A Housing for hydraulic control unit HCU and pressure supply device DV1 and optionally pressure supply device DV2
A1 Partial housing for HCU and pressure supply device DV2
A2 Partial housing for pressure supply device DV1
B Housing for ECU
C Housing for master brake cylinder HZ and travel simulator WS with flange
$a_{DV1}$ Motor axis of pressure supply device DV1
$a_{DV2}$ Motor axis of pressure supply device DV2
$a_{HZ}$ Longitudinal axis of master brake cylinder HZ
VB Reservoir
$VB_H$ Rear region of the reservoir
$VB_M$ Central region of the reservoir
$VB_V$ Front region of the reservoir
VA Front axle
HA Rear axle
1 Pedal plunger
2 Motor
3 Intermediate housing
4 Fastening screw
5 Sensor housing
6 Rotation angle sensor
7 Closure lid
8 Piston
9a/9b Connections to the reservoir VB
10 Connections to the wheel cylinder RZ
11 Connection to the master brake cylinder HZ
12 Flange of master brake cylinder HZ
13 Fastening screw
14 Fastening screw for bulkhead or bracket
15 Electrical connection between pressure supply device DV2 motor and electronic computing unit ECU
16 Electrical connection of pressure supply device DV1 motor
17 Electrical connection of the angle of rotational angle sensor 18 ECU housing
19 Web with seal
20 Driver for solenoid valve MV
21 Connection web of solenoid valve MV
22 Small PCB
22a Electrical connection of the main PCB to the PCB 22 of the electronic control unit ECU
23 Main PCB
24 HCU block
25 Bore for eccentric piston pump DV2
26 Motor for pressure supply device DV2
27 Outline contour 8", vacuum brake force booster BKV
28 Stop ring for piston
29 Line to the reservoir VB
30 Force-travel sensor KWS
31/31a Pedal rod
32 Spring housing
33 Master brake cylinder (HZ) piston
34 Sensor element
35 Target
36 Drive shaft
37 Toothed gear
38 Toothed rack
39 Guide part
40 Guide rail
41 Target
42 Inductive sensor
43 Master brake cylinder (HZ) housing
44 Travel sensor (WS) piston
44a Travel sensor (WS) spring
45 Travel sensor (WS) seal
46 Slide ring
47 Connecting bores travel sensor (WS)—master brake cylinder (HZ) and HCU block 24
48 Slide rings
49 Bearing part
50 Resetting spring
51 Plug connector strip with press-fit contacts
52 Sensor housing 1
52a Sensor housing 2
53 Measurement flange
54 Closure plug
55 Fastening, sensor housing
56 Threaded nut
57 Threaded spindle
58 Ball-screw drive KGT
59 Piston
60 Motor contact to ECU
61 Housing seal
62 Motor housing
63 Motor bearing
64 Rotor
100 Opening of the reservoir
101 Closure lid of the reservoir
152 Closable opening

What is claimed is:

1. An actuating device for a fully or partially hydraulically acting brake system for a vehicle, comprising the following:
a master brake cylinder with a piston-cylinder unit which has a piston and a working chamber, wherein the working chamber is hydraulically connected or connectable to a reservoir and to a pedal feel simulator and is mechanically connected via an actuating unit that includes a brake pedal, and the working chamber is connectable via at least one valve, which is open when electrically deenergized, to at least one brake circuit, at least one hydraulically acting wheel brake assigned to a brake circuit, and which is assigned in each case at least one dedicated controllable switching valve by means of which the wheel brake is connectable to the respective brake circuit for pressure build-up and pressure reduction,
a pressure supply which is driven by an electric motor and a piston of which is adjustable in a cylinder of the pressure supply by means of the electric motor,
at least one valve arrangement with solenoid valves for wheel-specific closed-loop pressure control,
at least one electrical control unit for controlling at least valves of the valve arrangement and the motor of the pressure supply, and
a superordinate control unit, distinct from the at least one electrical control unit,
wherein at least one electric parking brake and an electric drive motor are provided for driving at least one axle of the vehicle, wherein the electric parking brake and/or the electric drive motor transmit signals to and receive signals from the superordinate control unit, and
wherein a braking force of the parking brake and/or a torque of the electric drive motor is or are used for braking-force-imparted deceleration.

2. The actuating device as claimed in claim 1, wherein at least the actuation unit and/or the pressure supply has or have at least three seals, which are arranged in parallel with respect to one another, and at least two hydraulic connecting lines to the reservoir.

3. The actuating device as claimed in claim 1, wherein the pressure supply has redundant phase connections, redundant signal lines and/or redundant on-board electrical system connections.

4. The actuating device as claimed in claim 1, further comprising outlet valves disposed only at the wheel brakes of a front axle of the vehicle, wherein the outlet valves are arranged between the respective wheel brakes and switching valves.

5. The actuating device as claimed in claim 1, wherein the vehicle has front and rear axles, wherein the master brake cylinder is hydraulically connectable via a valve to the front axle and is enabled to be isolated from the pressure supply and a rear axle brake circuit by means of an isolation valve, and wherein at least one electric drive motor is provided at the rear axle for the purposes of braking force assistance in case of failure of the pressure supply or of the rear axle brake circuit.

6. The actuating device as claimed in claim 1, wherein the controllable switching valve is arranged such that a pressure prevailing in a wheel brake forces a valve control element of the controllable switching valve away from its valve seat.

7. The actuating device as claimed in claim 1, wherein:
the valve arrangement is arranged in a first housing;
the at least one electrical control unit comprises an open-loop and closed-loop control unit and is arranged in a second housing; and/or
the master brake cylinder is arranged in a third housing with pedal stroke sensors and a small sensor electrical control unit and the reservoir.

8. The actuating device as claimed in claim 7, wherein:
the master brake cylinder is screwed to the first housing; and/or
the third housing is mounted, as a subassembly separate from the first and second housings, onto a bulkhead and is connected to a hydraulic line from the master brake cylinder to the first housing.

9. A method for closed-loop pressure control using an actuating device as claimed in claim 4, the method including:
- performing pressure build-up and pressure reduction in brake force boosting operation exclusively by way of piston control of the piston-cylinder unit, with the outlet valves closed; and
- performing pressure build-up and pressure reduction in a recuperation operation by means of braking torque of the electric motor by way of piston control of the piston-cylinder unit, with the outlet valves closed.

10. A method for closed-loop pressure control with active anti-lock braking (ABS) or electronic stability control (ESP) function using an actuating device as claimed in claim 4, the method including:
- performing pressure build-up exclusively by way of piston control of the piston-cylinder unit in multiplex operation,
- performing pressure build-up and pressure reduction via open/closed switching valves simultaneously or in succession with the outlet valves closed, and/or
- performing pressure reduction via one or more of the outlet valves.

11. A method for closed-loop braking force control by means of an actuating device as claimed in claim 1, the method including:
- using braking force of the parking brake and/or torque of the electric drive motor for braking-force-imparted deceleration in the event of failure of one or more modules of the actuating device.

12. The actuating device as claimed in claim 7, wherein the first housing further contains a hydraulic component of the pressure supply.

13. The actuating device as claimed in claim 7, wherein the open-loop and closed-loop control unit is configured without redundancy with a main plug connector or with partial or full redundancy with two plug connectors to an on-board electrical system.

* * * * *